United States Patent [19]

Tinker

[11] Patent Number: 4,546,442
[45] Date of Patent: Oct. 8, 1985

[54] MICROCOMPUTER CONTROL SYSTEM FOR DESICCANT DRYER

[75] Inventor: Craig S. Tinker, Ocala, Fla.
[73] Assignee: Pall Corporation, East Hills, N.Y.
[21] Appl. No.: 444,502
[22] Filed: Nov. 24, 1982
[51] Int. Cl.[4] ............................................. B01D 53/04
[52] U.S. Cl. ..................................... 364/500; 55/162; 55/179; 55/163; 364/496; 364/558
[58] Field of Search ............... 364/558, 496, 497, 499, 364/500; 55/162, 163, 179

[56] References Cited

U.S. PATENT DOCUMENTS

| | | |
|---|---|---|
| 267,964 | 5/1881 | Gravatt . |
| 2,703,628 | 4/1955 | Pompeo et al. . |
| 3,448,561 | 6/1969 | Seibert et al. . |
| 4,023,940 | 5/1977 | Schultz ................................. 55/163 |
| 4,101,298 | 7/1978 | Myers .................................. 55/163 |
| 4,127,395 | 11/1978 | McKey et al. ......................... 55/20 |
| 4,197,095 | 4/1980 | White, Jr. et al. . |
| 4,247,311 | 1/1981 | Seibert et al. . |
| 4,299,595 | 11/1981 | Benkmann et al. ..................... 55/21 |
| 4,351,649 | 9/1982 | Owens et al. ......................... 55/162 |

OTHER PUBLICATIONS

Brochure, "AMLOC II Control for Pall Heat-Less Dryers," Pall Pneumatic Products Corp., Ocala, Fla., AM-306, Apr. 1982, (4 pages).
Pall Trinity Micro Corp. Engineering Report No. 601-67 on "Heat-Less AMLOC II Capacitance System-Description and Service Procedures," Dec. 18, 1981, (5 pages), [Trade Secret and Confidential].
Pall Trinity Micro Corp. Engineering Report No. 601-66 on "DEA AMLOC II Capacitance System-Description and Service Procedures," Dec. 18, 1981, (5 pages), [Trade Secret and Confidential].
Technical Data Sheet 1002, Electronic Valves, Clippard Instrument Laboratory, Inc. 7390 Colerain Road, Cincinnati, Ohio 45239, (4 pages).
Technical Data Sheet C-23, Miniature Cartridge Valves, Clippard Instrument Laboratory, Inc., 7390 Colerian Road, Cincinnati, Ohio 45239, (4 pages).
Liptak, *Instrument Engineers' Handbook*, vol. 1, Chilton Book Co., N.Y., 1969, pp. 861-863.
Long, Application Note 162, "LM2907 Tachometer/- Speed Switch Building Block," National Semi-Conductor, pp. 1, 2, 12, (FIG. 20, Capacitive Transducer).
HA/DHA AMLOC Wiring Schematic, Dwg. No. D3409-16QS [Heaterless Dryer Controller Using Mechanical Timer], Pall Trinity Micro Corp., 9/28/82 [Trade Secret and Confidential].
Wiring Schematic for DEA Models 100 to 1000, Dwg. No. E36020-46ESHYN [Heat Activated Dryer Controller Using Mechanical Timer], Pall Trinity Motor Corporation, 11/8/81 [Trade Secret and Confidential].
AMLOC II Demand Control Wiring Schematic, Dwg. No. 6AD36000-1D231, Pall Trinity Micro Corp., 12/7/81 [Trade Secret and Confidential].

*Primary Examiner*—Edward J. Wise
*Attorney, Agent, or Firm*—Leydig, Voit & Mayer, LTd.

[57] ABSTRACT

A microcomputer-based programmable control system for desiccant air dryers monitors the level of moisture saturation of the desiccant beds and adjusts the regeneration cycle accordingly to optimize energy efficiency. The moisture sensors have capacitance probes and adjustable resistors as frequency determining components for precision oscillators. A multiple counter integrated circuit is controlled by the microcomputer to establish a predetermined time interval and to count cycles of the precision oscillators during the predetermined time interval to obtain final counts for each probe indicative of the level of moisture saturation in the respective desiccant beds. The microcomputer compares the final counts to predetermined threshold number in order to determine whether a regeneration cycle is required, and also compares the final counts to maximum and minimum threshold numbers to detect and indicate probe failure. A pair of high and low pressure sensitive switches is provided for each desiccant bed, and the microcomputer tests for coincidence of the high switches and the low switches to monitor full depressurization and repressurization of the regenerating bed and to analyze and indicate valve malfunction. The control system directly activates low current, low capacity solenoid valves which in turn operate high pressure pneumatic relays to drive the valves in the air dryer.

7 Claims, 12 Drawing Figures

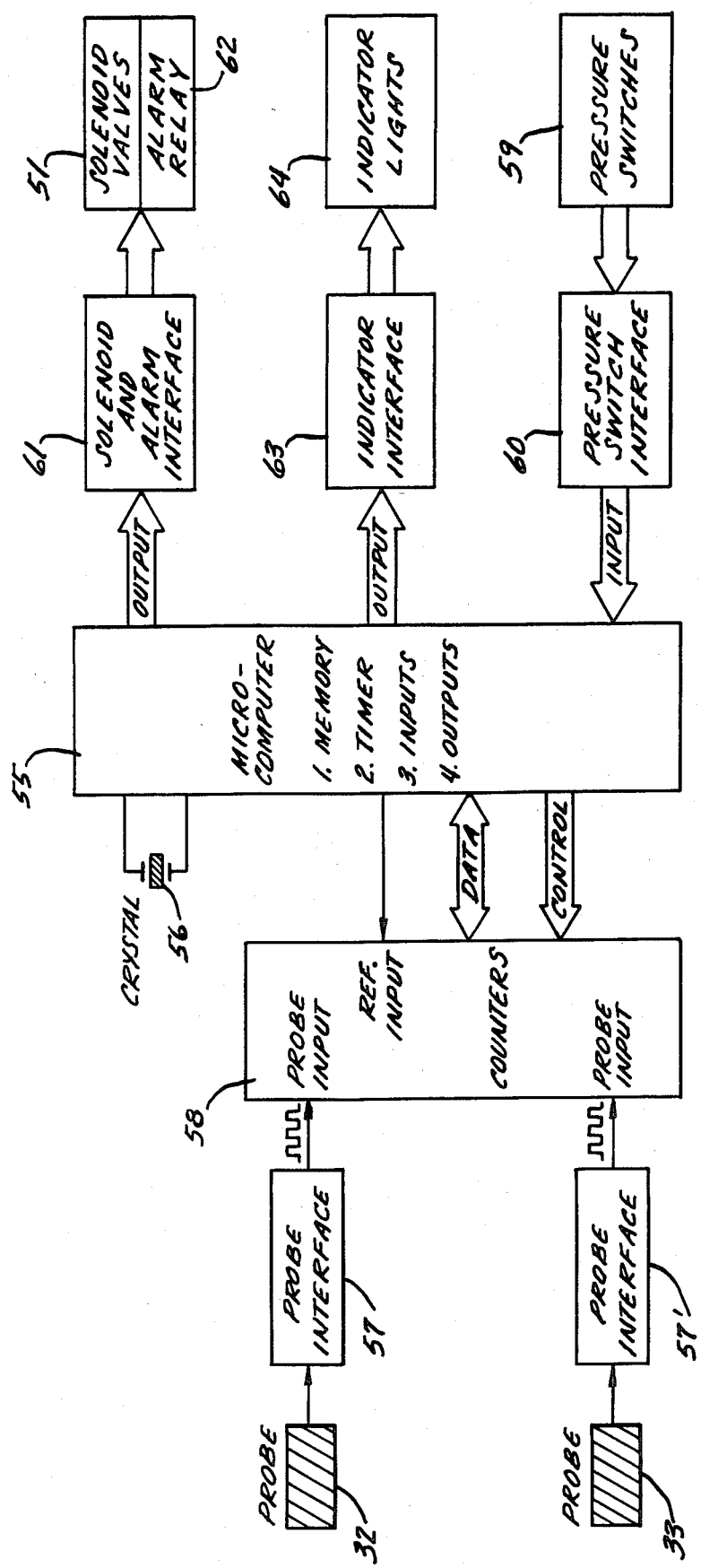

MICROCOMPUTER CONTROL SYSTEM FOR DESICCANT DRYER

TECHNICAL FIELD

This invention relates generally to the field of gas dryers. In particular, this invention relates to a control for a desiccant gas dryer of the type having a pair of desiccant beds, wherein one bed is regenerated as the other bed adsorbs vapor. A control is required to periodically switch the flow of gas between the bed adsorbing vapor to the bed being regenerated.

BACKGROUND ART

The desirability of drying air after compression is well known. A variety of systems have been developed over the years for this purpose, many of which employ two beds containing an adsorbent desiccant material such as activated alumina. In such systems the beds alternatively dry the process stream and then are regenerated either using an auxiliary source of heat in so-called heat-reactivated systems, or through conservation and use of the heat of adsorption for effecting regeneration, in so-called heaterless systems. In heat-reactivated systems, it has been common to use fixed cycles several hours in length, such that a bed is on adsorption for a period of time, perhaps eight hours, after which it is regenerated during the eight hour adsorption cycle for the other bed. In the heaterless systems relatively short, fixed cycle times are usually used, typically about four minutes for drying with four minutes allowed for regeneration while the other bed is drying the process stream. Mechanical cam timers operating solenoids which in turn operate the flow control valves have typically been employed for the control of such fixed cycle systems.

Typically both heat-reactivated and heaterless systems are sized for maximum contemplated loading conditions, a condition which may seldom or never be encountered during actual operation. As a result, at the end of a fixed drying cycle a bed may have adsorbed only a fraction of its moisture capacity. In the case of heat-reactivated dryers, such underutilization of the bed while on adsorption coupled with a full energy regeneration can seriously affect overall operating efficiency. Moreover, in the case of heat-reactivated dryers which employ resistance heaters within the beds, sometimes referred to as internal heat-reactivated dryers, regeneration with only a partial moisture load on the bed can result in excessive heating of the desiccant, which not only tends to degrade the desiccant but can also be dangerous.

Similarly, off-peak operation of heaterless dryers on fixed cycles can result in low operation efficiencies. By their nature heaterless dryers employ approximately 15% of the dry product air for regeneration purposes such that unnecessarily purging a partially loaded bed for the full regeneration period is highly inefficient.

Several systems have been suggested in recent years using "demand" rather than fixed cycling for both heat-reactivated and heaterless dryers. U.S. Pat. No. 3,448,561 discloses a system for sensing the actual moisture content of the on-stream bed and terminating the adsorption cycle when the bed is saturated. Alternatively, the patent suggests that the moisture content of the regenerating bed can be monitored, terminating the purge flow when the moisture content of the bed has dropped below a predetermined minimum. That patent discloses the use of a lithium chloride humidity sensor external to the desiccant bed with gas sampling conduits leading from the beds to the cell.

Another method which has been suggested for determining the moisture loading of a bed involves the placing of a capacitor directly into an adsorbent bed with adsorbent between the plates. As the moisture loading varies, the dielectric constant of the adsorbent changes, such that the capacitance provides an electrical indication of the moisture loading. Such a capacitance sensing arrangement is disclosed in application Ser. No. 267,964 filed May 27, 1981.

In one system which has been developed for the use of a capacitance as disclosed in the co-pending application, a periodic electric potential is applied to the capacitance probe so that its response is a function of the capacitance. A frequency to voltage converter generates a moisture indicating voltage proportional to the capacitance of the capacitance probe. Typically a differential amplifier compares the moisture indicating voltage to a threshold voltage to generate a binary signal indicating that the desiccant is fully regenerated. The moisture indicating voltage is also compared to high and low threshold voltages defining a range of moisture content from 0 to 100% saturation of the desiccant. Any voltage out of this range is assumed to be due to sensor malfunction and hence the "window comparison" provides a failure signal.

The prior art moisture sensor comprising the capacitance probe and the electronics for performing a frequency to voltage conversion and threshold comparison function performs its intended function of generating a binary signal indicating the end of required regeneration, but it does so using rather sensitive and "touchy" analog circuits. The analog circuits require stable reference voltages and are sensitive to component aging, tolerances and drift. In order to eliminate undesired noise on the moisture sensing voltage the moisture sensing voltage analog signal is typically low-pass filtered at a time constant of approximately ten seconds. This time constant slows down the response of the sensor and the rather high resistance and capacitance component values for providing the ten second time constant are undesirable. The one binary bit of moisture indicating information provided to the air dryer control system by the moisture sensor is a rather small portion of the information monitored by the sensor, but it is just about all of the information that the prior art control system can use.

As suggested in the co-pending application referenced above a binary signal indicating that the desiccant is fully regenerated may be used in conjunction with the flow valve control system with either heat-regenerated or heaterless dryers to result in "demand" cycling.

In addition to the deficiencies noted with the previously suggested capacitance-monitoring system, known controls for valving to alternatively shift flow between desiccant beds have numerous disadvantages. As already noted mechanical cam timers have typically been employed to provide fixed length cycles. Such mechanical timer circuits have recently been adapted for use with capacitance sensing arrangements of the type discussed above to provide "demand" cycling in both heat-regenerated and heaterless dryers by inhibiting certain of the timing signals. Such mechanical timer based systems tend to be bulky, offer little or no "reprograming" flexibility and can be difficult to accurately adjust.

DISCLOSURE OF INVENTION

The general aim of the invention is to provide an intelligent control system for desiccant gas dryers which monitors at least the level of vapor saturation of the desiccant beds and adjusts the regeneration cycle accordingly to optimize energy efficiency.

Another object of the invention is to provide a modular control system which is easily adapted to various types and sizes of desiccant gas dryers. A related object is to provide a control system that is easily specified, installed and maintained.

Yet another object of the invention is to provide a desiccant moisture sensor which is essentially digital in nature and which supplies the control system with an increased amount of usable information. A related object is to provide a desiccant moisture sensor that has a reduced parts count and which is easier to assemble, calibrate and maintain, and which is not substantially affected by component tolerances, aging and drift.

Still another object of the invention is to provide a gas dryer control system having expanded system diagnostic and condition indicating functions.

In accordance with the invention, each desiccant bed in a desiccant gas dryer has a capacitance probe so that the level of condensate saturation of the desiccant is indicated by the capacitance of the respective probe. The capacitance of the probe determines the frequency of an oscillator so that the oscillator output is a binary or digital signal indicating the level of condensate saturation in the respective bed. Means are provided for counting the cycles of the oscillator output during a predetermined time interval established by timer means. Means are provided for obtaining a final count from the means for counting at the end of the predetermined time interval so that the numeric value of the final count is indicative of the level of condensate saturation of the respective desiccant bed. A microcomputer executing a stored sequence of instructions accepts the final count for determining the relative condensate saturation level and accordingly controls the regeneration of the respective desiccant bed. The microcomputer comrpises means for comparing the final count to a predetermined threshold count representative of the condensate saturation level for which regeneration is required, and further comprises means for generating a regeneration enable signal in response to that comparison.

In accordance with further features of the invention, the microcomputer comprises means for periodically changing the bed selected for drying and the bed selected for regeneration within a preset minimum period, so that the vapor load is shared among the desiccant beds.

In order to detect probe failure, preferably the microcomputer has means for comparing the final count to a predetermined maximum count and a predetermined minimum count, and also means for indicating to a maintenance person that probe failure is sensed if the final count either exceeds the maximum count or is less than the minimum count. The microcomputer also comprises means for activating the regeneration of the beds at least once during each bed select cycle so that the beds are periodically regenerated in the event of the sensed probe failure.

In an important embodiment of the invention, the control system is specifically configured for controlling a heaterless gas dryer wherein the beds are regenerated at a minimum pressure such as atmospheric pressure, while the gas to be dried is at an elevated pressure. In order to detect the failure of the valves which pressurize and depressurize the beds for drying and regeneration, respectively, for each bed a high pressure sensing switch and a low pressure sensing switch is provided. The threshold pressure of the high pressure switches is substantially below the elevated gas pressure, and the threshold of the low pressure switches is below the threshold of the high pressure switches and substantially above the minimum pressure. In other words, each high pressure switch is in its active state when the respective bed is pressurized to the elevated pressure, so that the high pressure switch detects substantially full pressurization, while each low pressure switch is in its corresponding inactive state only when the bed is approximately at the minimum pressure, thereby indicating proper valve operation for depressurization.

In order to reduce the number of pressure switch signals to be sampled by the microcomputer to determine proper valve operation, means are provided for generating a high pressure coincidence signal active when the high pressure switches are in the same state, and means are provided for generating a low pressure coincidence signal active when the low pressure switches are in the same state. The microcomputer comprises means for sampling both the high pressure coincidence signal and the low pressure coincidence signal at least once during each full cycle of the bed change signal, at times sufficiently delayed from the time that the beds are switched over from drying to regeneration and at times sufficiently delayed from the beginning of regeneration. If the idle bed is depressurized, its switches are in their inactive states and thus different from the active states of the pressurized drying bed. Thus if the idle bed is properly depressurized, the coincidence signals will be inactive. But when the idle bed is repressurized, its switches will be in their active states and thus in the same states as the active switches in the drying bed. Consequently, when the idle bed is properly repressurized the coincidence signals are in their active states. Means are provided for indicating the occurrence of a general valve malfunction to a maintenance person if either one of the pressure coincidence signals is active when sampled during the time the regeneration enable signal is active. Similarly, means are provided for indicating the occurrence of an exhaust valve malfunction when the idle bed fails to be repressurized, as sensed by an inactive coincidence signal sampled when the regeneration enable signal is not active.

In a preferred embodiment a single chip microcomputer integrated circuit is coupled with a multiple counter integrated circuit. The counter integrated circuit itself embodies the means for counting, the timer means and the means for obtaining a final count from counting means.

BRIEF DESCRIPTION OF THE DRAWINGS

Other objects and advantages of the invention will become apparent upon inspection of the drawings, wherein:

FIG. 4 is a block diagram of the exemplary embodiment of the control system according to the invention;

While the invention has been described in connection with a preferred embodiment it will be understood that the intention is not to be limited to the particular form of the invention which has been shown, but the intention is, on the contrary, to cover the various alternative and equivalent constructions included within the spirit and scope of the appended claims.

BEST MODE FOR CARRYING OUT THE INVENTION

Figure 1:
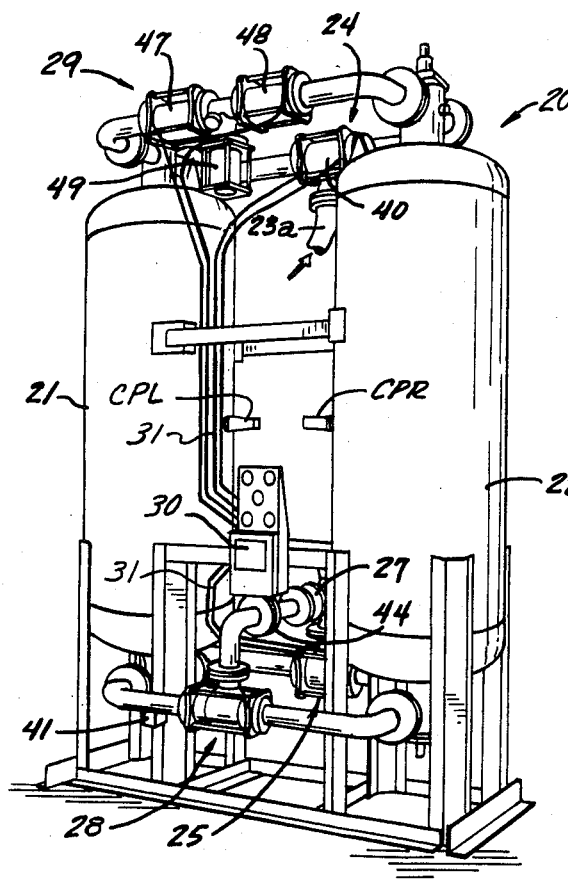
FIG. 1 is a perspective view of a heaterless air dryer employing an exemplary embodiment of the control system for controlling a heaterless dryer.
Figure 2:
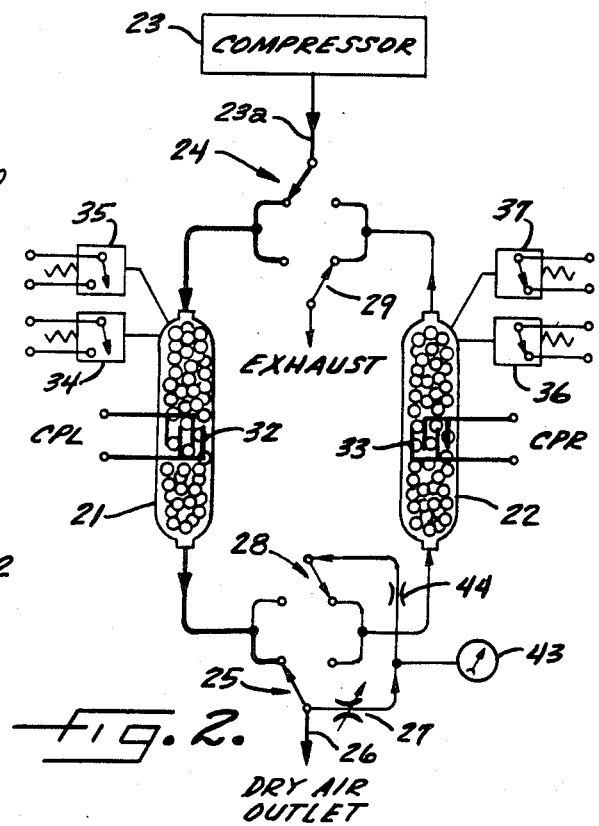
FIG. 2 is a simplified schematic diagram of the heaterless dryer, moisture sensing probes and pressure switches according to the exemplary embodiment of the invention.

Turning now to the drawings, there is shown in FIG. 1 a prespective view of the main components of a heatless air dryer generally designated 20. A corresponding schematic diagram is shown in FIG. 2. The air dryer 20 has left and right desiccant beds or chambers 21, 22 for drying air received on an inlet pipe 23a from a compressor 23. An inlet valve assembly generally designated 24 alternately switches the compressed air to the left or right chamber. Similarly an output valve assembly generally designated 25 passes the dry compressed air to an outlet pipe 26. A portion of the dried compressed air expands to approximately atmospheric pressure through a bleeder valve 27 (having an associated pressure gauge 43 and orifice 44) which is alternately switched to the idle desiccant bed for regeneration. After picking up moisture from the desiccant in the regenerating bed, the air is vented to atmospheric pressure through an exhaust valve assembly 29.

The positions for the valves 24, 25, 28, and 29 are shown for the left desiccant bed 21 serving to dry the air and the right desiccant bed 22 being regenerated. The valves are switched to their alternate positions in order to use the right desiccant bed 22 to dry the compressed air and to allow the left desiccant bed 21 to be regenerated.

As shown in FIG. 1, the electronic components of the control system are enclosed in a centrally located housing 30 and the control system activates the valves 24, 25, 28, and 29 by pneumatic lines 31. The control system also has left and right moisture sensing capacitance probes 32, 33 and pressure switches 34, 35, 36, 37 for sensing the conditions inside the respective left and right desiccant beds 21, 22.

Figure 3A:
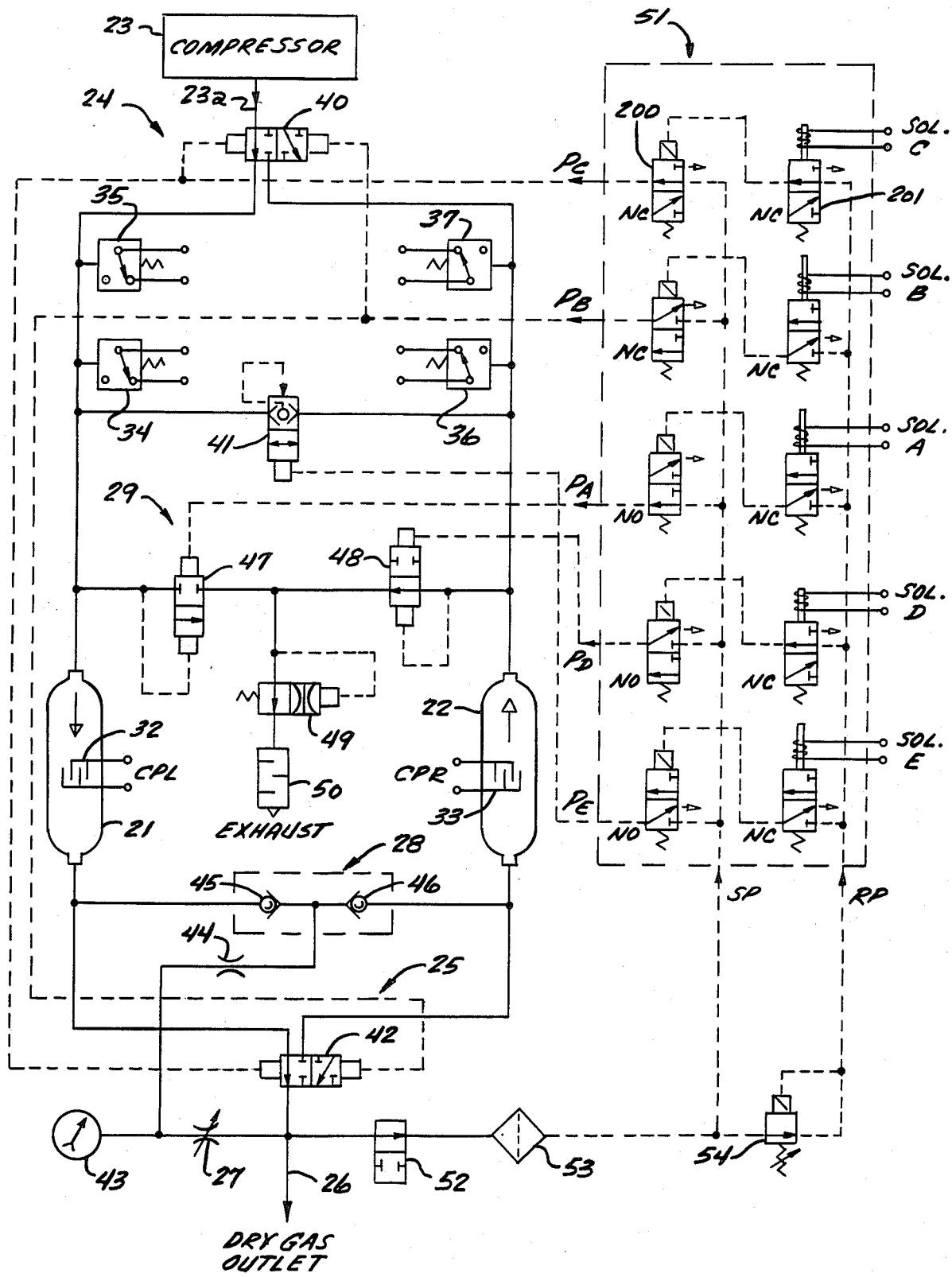
FIG. 3A is a detailed schematic diagram corresponding to the simplied schematic shown in FIG. 2.

A more complete schematic diagram of the mechanical components and sensors for the heaterless dryer are shown in FIG. 3A. The inlet valve assembly 24 is comprised of a single three-way inlet valve 40 driven by a differential pressure input. Associated with this three-way inlet valve is a repressurizing valve 41 which permits the bed having been previously regenerated to be repressurized without substantially interrupting the flow of dry air out the outlet pipe 26. In other words, if the inlet valve 40 were merely switched to repressurize the regenerated bed, the flow of dry air out the outlet pipe 26 would be disrupted during the time required for the pressure to build up in the regenerated bed. In the same fashion as the inlet valve assembly 24, the outlet valve assembly 25 is comprised of a single three-way outlet valve 42 which is driven by the same differential pressure that operates the three-way inlet valve 40.

The bleeder valve 27 proportionately divides the outlet pressure across itself and the orifice 44, so that the flow through the orifice is regulated by the adjustment of the bleeder valve. The pressure gauge 43 is responsive to the pressure across the orifice 44 and thus indicates the air flow to the regenerating desiccant bed. The air for regeneration passes through the bleeder valve 27 and through the orifice 44 to a pair of check valves 45, 46 which comprise the valve assembly 28 which directs the dry air to the desiccant bed being regenerated.

The exhaust valve assembly 29 is comprised of two separate two-way valves 47, 48 for dumping the exhaust from the respective chambers during regeneration. These two-way dump exhaust valves are actuated by the difference in pressure in the respective desiccant bed and respective control pressures. The dump exhaust is passed to a dump flow restrictor 49 which limits the exhaust air flow to a reasonably small rate so that the desiccant beads or pellets in the desiccant bed are not "fluidized" when the respective dump exhaust valve 47, 48 is first opened at the start of regeneration. An exhaust muffler 50 reduces air dynamic noise associated with the dumping of the pressurized bed.

The inlet valve 40, repressurizing valve 41, outlet valve 42, and exhaust valves 47, 48 are operated by pneumatic pressures $P_C$, $P_B$, $P_E$, $P_A$, $P_D$, respectively,- generated by a solenoid valve and pneumatic relay assembly generally designated 51 including a set of pneumatic relays 200 operated by electromagnetic solenoid valves 201. The use of pneumatic relays 200 in addition to solenoid valves 201 permits the solenoid valves to be operated by very low relay coil currents of about 250 milliamperes. The pneumatic relays 200 switch air at the high pressure SP of the dry gas outlet 26 as supplied through a valve 52 and a prefilter 53. The solenoid valves 201, however, operate at a relatively low regulated pressure RP of up to 100 PSI above atmospheric pressure, as set by an adjustable pressure regulator 54, and have a very low flow capacity when they are open. The solenoid valves 201 are all normally closed (NC), while the pneumatic relays 200 are either normally open (NO) or normally closed (NC) as designated in FIG. 3A.

Figure 3B:
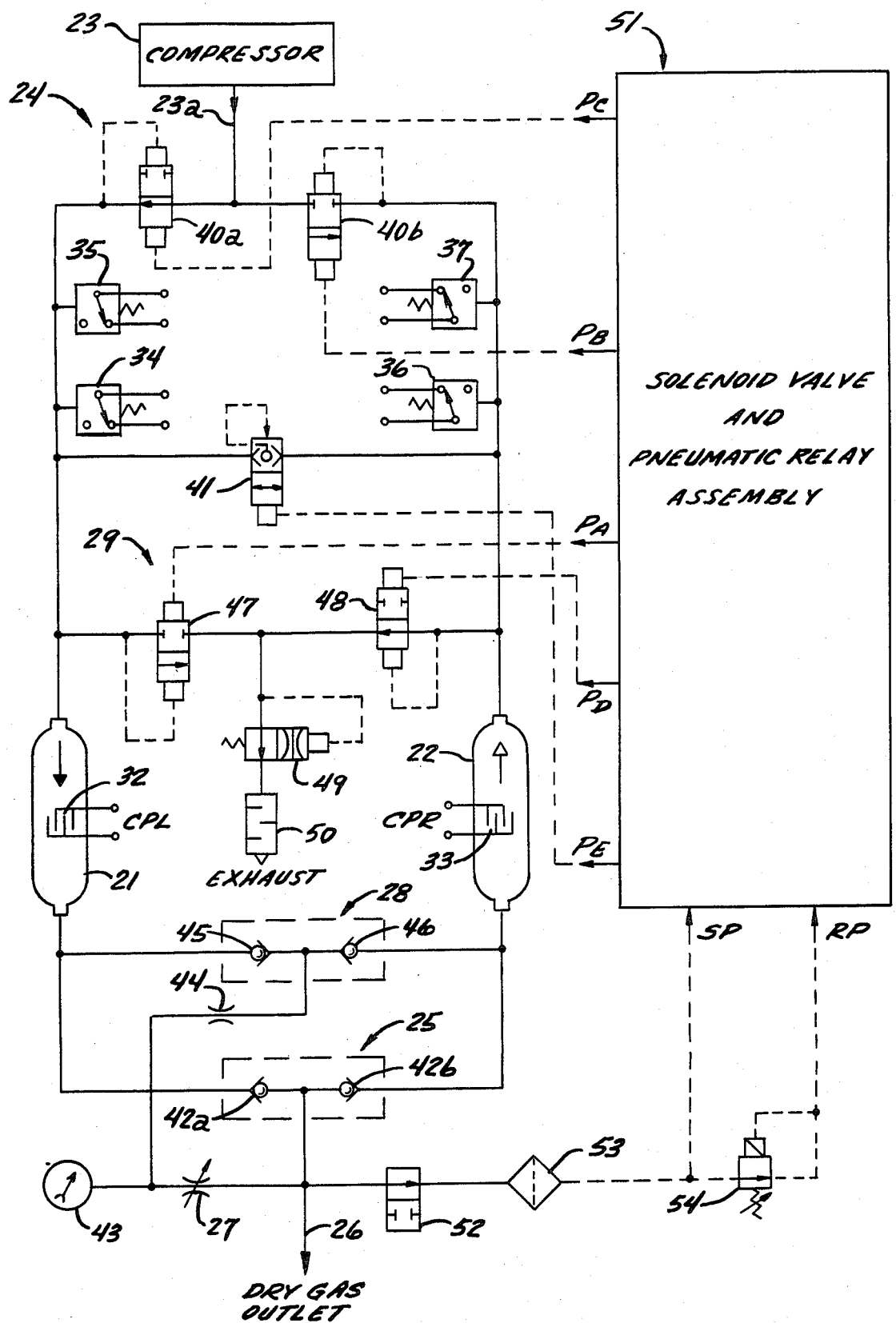
FIG. 3B is an alternative detailed schematic diagram corresponding to the simplified schematic shown in FIG. 2.

The valve arrangement shown in FIG. 3A is especially suited for high capacity air dryers (e.g., FIG. 1) having, for example, three inch diameter pipes and valves in the process air stream (bold path in FIG. 2). An alternative valve arrangement suitable for lower capacity air dryers is shown in FIG. 3B. Two separate one-way inlet valves 40a, 40b are used in lieu of the two-way inlet valve 40 shown in FIG. 3A, and check valves 42a, 42b are substituted for the two-way outlet valve 42 shown in FIG. 3A.

Figure 3C:
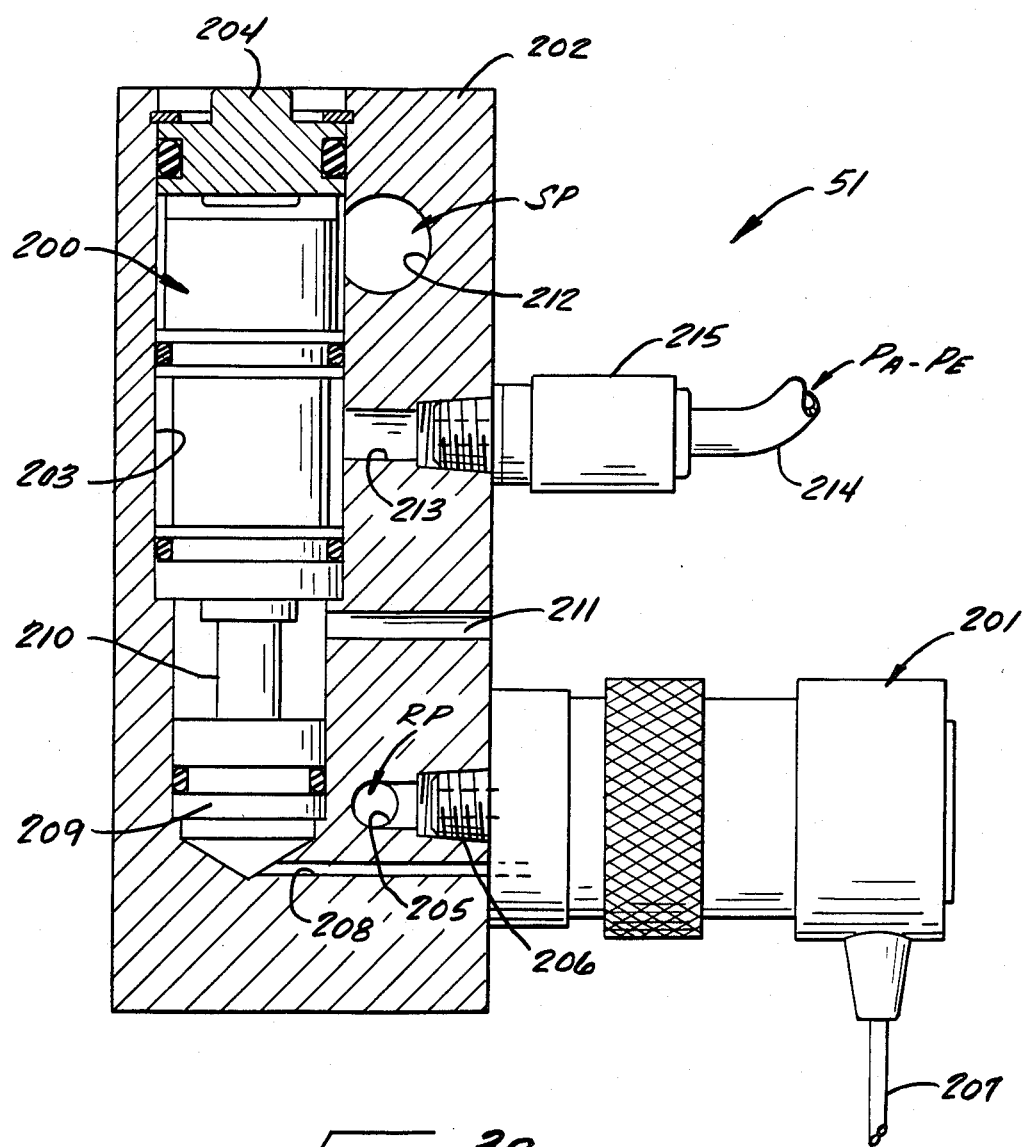
FIG. 3C is a detailed diagrammatic view, in partial section, of a solenoid valve and pneumatic relay of the type used in FIGS. 3A and 3B.

A partial cross-sectional view of the solenoid valve and pneumatic relay assembly 51 is shown in FIG. 3C. The solenoid valve 201 is a three volt model EV-3M miniature electronic valve manufactured by Clippard Instrument Laboratory, Inc., 7390 Colerain Road, Cincinnati, Ohio 45239. The solenoid valves 201 are screwed into a common manifold 202. The pneumatic relays 200 are recessed into vertical bores 203 in the common manifold 202. Vertical bores 203 receive the pneumatic relays 200 which are model MJV-3C or model MJVO-3C (normally closed NC or normally open NO, respectively) cartridge valves also manufactured by Clippard Instrument Laboratory, Inc. End caps 204 retain the cartridge valves 200 into the bores.

For each solenoid valve 201 and cartridge valve 200, a longitudinal bore 205 supplies regulated pressure RP to the solenoid valve 201 through a threaded inlet port 206 on the solenoid. The threaded inlet port 206 also provides the mechanical connection between the solenoid valve 201 and the common manifold 202. The solenoid valve 201 is activated by electrical current received from lead wires 207. A traverse bore 208 receives the regulated pressure when the solenoid valve 201 is energized. A piston 209 responds to the switched regulated pressure and drives the valve stem 210 of the associated cartridge valve 200. A spring internal to the cartridge valve 200 provides a return force, since a traverse bore 211 sets the opposing pressure on the piston 209 to atmospheric pressure.

A longitudinal bore 212 conveys the supply pressure SP to the cartridge valves 200. For each cartridge valve, the respective control pressure $P_A$-$P_E$ is passed via a traverse bore 213 to a pneumatic line 214 secured to the common manifold 202 by a connector 215 screwed into the traverse bore 213.

A block diagram of the control system according to an exemplary embodiment of the invention is shown in FIG. 4. The central component of the control system is a microcomputer integrated circuit 55. The microcomputer is an Intel Corp. part number D8748 having an internal crystal oscillator using an external quartz crystal 56, and also having internal random access and fixed or program memory, a timer, and input and output ports. The most significant data is derived from the left and right capacitance probes 32, 33. Probe interface circuits 57, 57' comprise oscillators having frequency setting capacitance inputs connected to the respective probes. The frequencies of oscillation generated by the probe interfaces 57, 57' are indicative of the capacitances of the respective probes and are thus also indicative of whether the respective desiccant beds need to be regenerated. A multiple counter integrated circuit 58, Intel Corp. part number D8253, has means for counting the frequency generated by each of the probe interfaces 57, 57' and also has a timer counter establishing a predetermined time interval for enabling the other counters so that final counts are obtained indicating the number of cycles generated by each probe interface during the time interval of the timer counter. The microcomputer 55 controls the operation of the counter integrated circuit 58 and also exchanges data with the counter integrated circuit for setting the predetermined time interval of the timer counter and also for initially setting the counters counting the frequencies from the probe interfaces. The microcomputer receives the final counts from the counter integrated circuit 58 so that the microcomputer senses the level of saturation of the desiccant in each bed. The microcomputer 55 also receives pressure data generated by the pressure switches generally designated 59 in FIG. 4, corresponding to the four pressure switches 34-37 shown in FIG. 2. A pressure switch interface 60 processes the pressure switch signals before they are passed to the microcomputer 55.

The microcomputer 55 feeds data to a solenoid and alarm interface 61 for generating a sufficiently high current level to drive the solenoid valves 201 and an alarm relay REL. The microcomputer also feeds an output interface 63 for driving a set of indicator lights 64. These lights indicate whether the left or right desiccant bed is selected for drying the compressed air, and also indicate probe and valve malfunctions.

Figure 5:
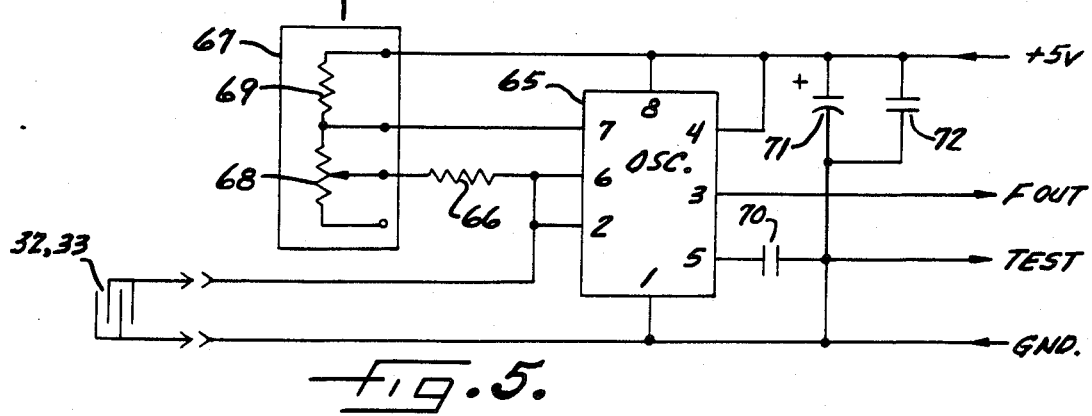
FIG. 5 is a schematic diagram of a preferred embodiment of the probe interface.

A common schematic for each probe interface 57, 57' is shown in FIG. 5. In order to generate a periodic signal having a frequency FOUT responsive to the capacitance of the connected probe 32 or 33, a precision oscillator integrated circuit 65, part number 555, is used. The time constant of the oscillator is set by the capacitance of the probe 32, 33 and the resistance of a one megohm resistor 66 in series with an adjustable control 67, Bourns Corp. part number 7105A-108-504. The control 67 comprises a 400K ohm variable resistor 68 in series with a fixed resistance 69 of value 100K ohms. The control 67 is initially adjusted to calibrate the capacitance probe 32, 33 so that it generates a desired output frequency FOUT for a desired calibration level of saturation of the desiccant. The integrated circuit oscillator 65 also uses a capacitor 70 of value 0.01 microfarads. Power supply filtering capacitors 71 and 72 of values 1 microfarad and 0.1 microfarad suppress any noise on the +5V input lead and the ground GND lead to the probe interface circuit. A third TEST lead is used so that the microcomputer 55 can determine whether the proh=interface is used in the system.

Figure 6:
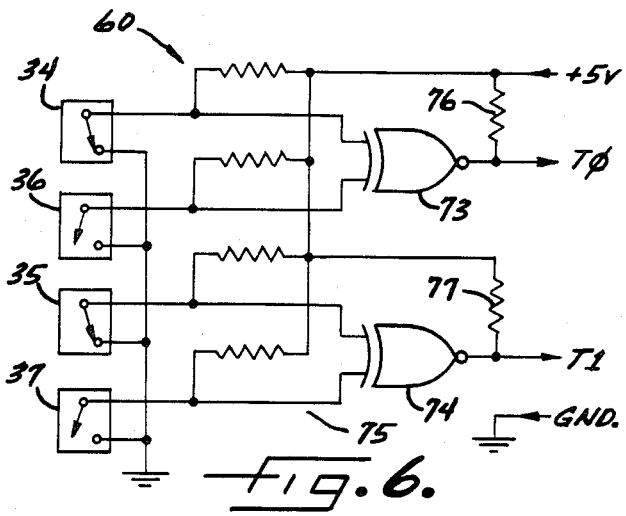
FIG. 6 is a schematic diagram of a preferred embodiment of the pressure switch interface for generating high and low pressure coincidence signals.

The input interface 60 for the pressure switches 34-37 is shown in FIG. 6. Pressure switches 34 and 36 have a relatively low pressure threshold while switches 35 and 37 have a relatively high pressure threshold. The switches are open when the respective pressures exceed the respective thresholds. The high pressure threshold is substantially below the pressure of the compressed air, while the threshold of the low pressure switch is substantially above the atmospheric or minimum pressure in the system. The high pressure threshold, for example, is set at 60 PSI in order to be below maximum pressures of 80 PSI and above. The low pressure threshold, for example, is set at 1 PSI above atmospheric pressure. Preferably the switches are Hall effect sensors (e.g., Texas Instruments Corp. part No. TL172C) indicating the respective positions of magnets mounted on respective pistons in pressure sensing cylinders.

The signals from the low pressure switches 34, 36 are combined by an exclusive-NOR gate 73 to generate a low pressure coincidence signal T0. The low pressure coincidence signal T0 is active high when the low pressure switches 34, 36 are in the same state. When one of the desiccant beds 21, 22 is depressurized for regeneration while the other is pressurized for drying, the low pressure switches should normally be in different states due to the wide difference in pressure, and the different states should be indicated by the low pressure coincidence signal being a logical low. At the end of regeneration, the regenerated bed is repressurized and hence at the end of repressurization both of the low pressure switches 34, 36 should be in the same state so that the low pressure coincidence signal T0 should be in a high state. Similarly, an exclusive-NOR gate 74 combines the signal from the two high pressure switches 35, 37 to generate a high pressure coincidence signal T1, which should be a logical low when one of the desiccant beds is depressurized for regeneration, and a logical high when the regenerated bed is repressurized. By generating the coincidence signals from the high pressure or low pressure switch signals, the number of input lines to the microcomputer 55 is reduced. Also by using both high pressure switches and low pressure switches, the microcomputer 55 senses whether the regenerating cylinder is fully depressurized to below the low threshold, and can sense whether the regenerated cylinder is fully repressurized to above the high pressure threshold. Also shown in FIG. 6 are pressure switch pull-up resistors generally designated 75 of value 2.2K ohms which are needed to interface the pressure switches 34-37 to the exclusive-NOR gates 73, 74. The exclusive-NOR gates 73, 74, National Semiconductor part No. SN54LS266N, also use output pull-up resistors 76, 77, respectively, for interfacing their outputs to the inputs of the microcomputer 55.

Figure 7:
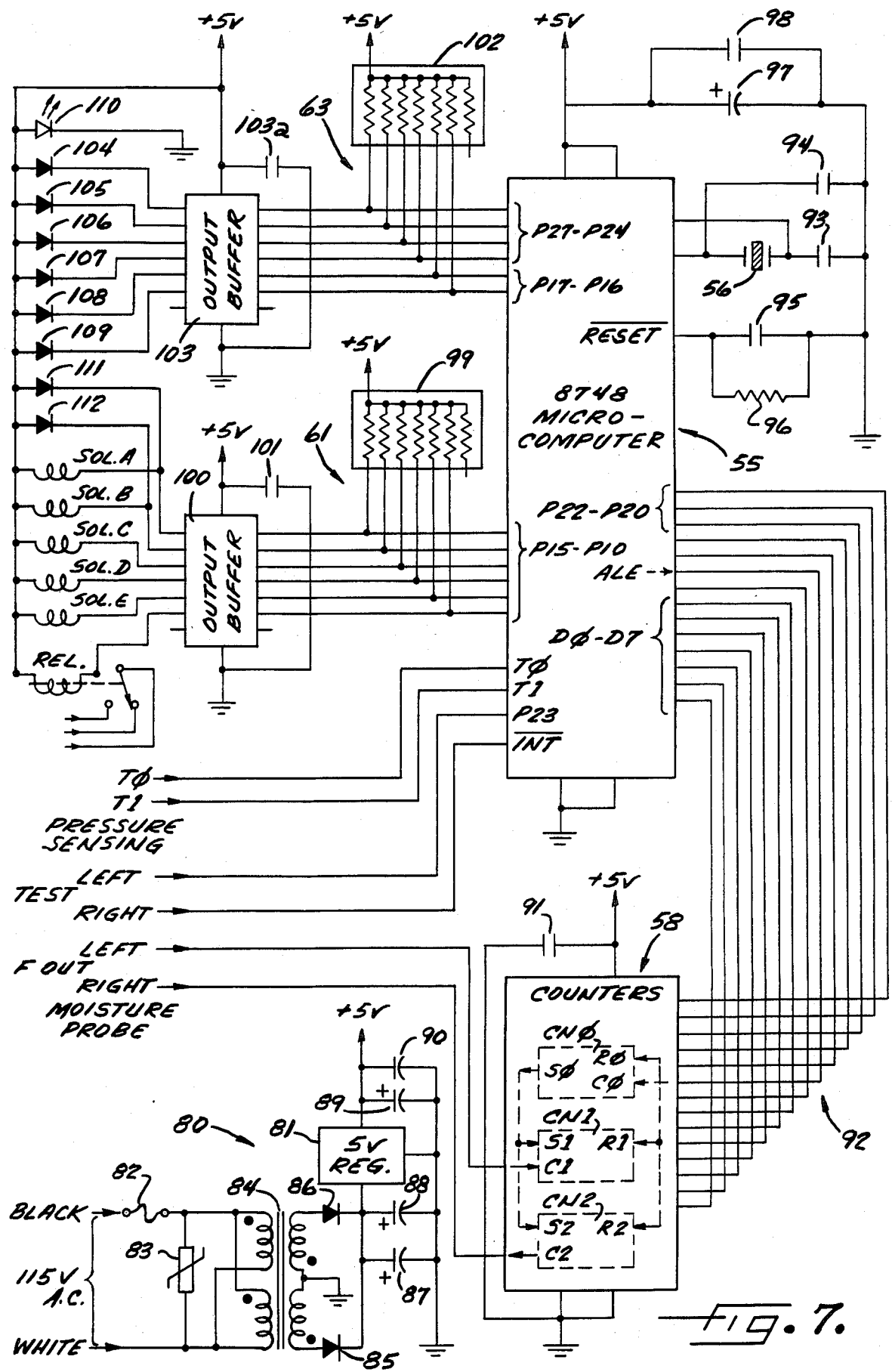
FIG. 7 is a schematic diagram of the microcomputer, counter integrated circuit, power supply and output buffers for driving condition indicating LEDs and valve control solenoids used in the exemplary embodiment of the control system.

The schematic for the microcomputer 55, counter integrated circuit 58, solenoid valve and alarm relay interface 61, and indicator light interface 63 is shown in FIG. 7. The control system is powered by a 5 volt power supply generally designated 80, having a 5 volt regulator integrated circuit 81, National Semiconductor Corp. part no. LM7805CT. The power supply 80 operates off conventional 115 volt alternating current power lines. The BLACK line is fused by a ¼ ampere slow-blow fuse 82 and shunted to the WHITE power line by a varistor 83, General Electric Corp. part No. Z130LA10A, in order to suppress any transient spikes on the power lines. A universal 12 volt 1 ampere step-down transformer 84 feeds full wave rectifier diodes 85, 86, part number 1N4002, to generate approximately 10 volts DC across two 1000 microfarad filter capacitors 87, 88. The regulator 81 outputs 5 volts DC across its 100 microfarad and 0.1 microfarad output capacitors 89, 90 respectively.

The counter integrated circuit 58 has an associated 0.1 microfarad decoupling capacitor 91 and receives the output frequencies FOUT from the left and right probe interface circuits 57, 57'. The counter integrated circuit 58 has in fact three different counters identified as CN0, CN1, and CN2. Clock input C1 receives the frequency from the left probe interface 57, while the clock input C2 receives the output frequency of the right probe interface circuit 57'. The C0 clock input receives a 122.88 kilohertz periodic signal from the ALE output on lead 11 of the microcomputer integrated circuit 55. All three counters have reset inputs R0, R1, R2, respectively, which receive initial counts from the microcomputer over a bus generally designated 92. The connections for this bus 92, in terms of the conventional pin or lead numbers of the respective microcomputer and counter chips 55 and 58, are as follows: the signal P22 from the micricomputer 55 on lead 23 is connected to the counter signal GATE 0 on counter lead 11, microcomputer output P21 on lead 22 is connected to counter signal A0 on counter lead 19, microcomputer output signal P20 on lead 21 is connected to counter input A1 on counter lead 20, microcomputer output $\overline{RD}$ on lead 8 is connected to counter input RD on lead 22, microcomputer output $\overline{WR}$ on lead 10 is connected to counter input WR on lead 23, microcomputer output ALE on lead 11 is connected to counter input C0 on lead 9, and microcomputer data bus outputs DB0–DB7 on leads 12–19, respectively, are connected to counter data inputs D0–D7 on counter leads 8–1, respectively. The data bus 92 is also used to pass control signals from the microcomputer 55 to the counter inputs GATE0, A0, and A1 for control of the counter integrated circuit 58, as will be described further in conjunction with the exemplary procedure executed by the microcomputer.

In general terms, the counters CN0, CN1, and CN2 are first set to initial values by data written from the microcomputer 55 over the bus 92 into the counters. Then the first counter CN0 is enabled to count the frequency on its clock C0 to generate a sampling or gating signal on its output S0 which is fed to sampling or disabling inputs S1, S2 on the other counters CN1, CN2, respectively. The counter CN0 generates an active end of counting or sampling signal or logic transition on its output S0 a predetermined time after the counters are enabled for counting, the predetermined time being a function of the initial count loaded into the first counter CN0. For the microcomputer procedure described below, the predetermined time interval is approximately ½ of a second. Over this time period, the second and third counters CN1, CN2, respectively, count the cycles or transitions generated by the left and right probe interface circuits 57 and 58. After the predetermined time interval, final counts are obtained from the second and third counters CN1, CN2 which are transferred across the bus 92 to the microcomputer 55. These final counts are responsive to the frenquencies FOUT generated by the left and right probe interface circuits 57, 57' and thus indicate the moisture in the desiccant beds sensed by the probes 32, 33.

The microcomputer 55 uses this moisture indicating data to adjust a controlling sequence for activating the solenoid valves 51 in FIG. 3 to properly control the operation of the desiccant dryer 20 in FIG. 1. The controlling sequence executed by the microcomputer 55 is also adjusted in accordance with the low pressure coincidence signal T0 received on the microcomputer's T0 input on lead 1, and the high pressure coincidence signal T1 received on the microcomputer's T1 input on lead 39. Moreover, the TEST outputs from the left probe interface 57 and right probe interface 57' are received by the microcomputer 55 on inputs P23 on lead 24 and $\overline{INT}$ on lead 6, respectively.

The microcomputer executes its procedure at a precise 1.8432 megahertz rate set by the crystal 56 which is connected across leads 2 and 3 of the microcomputer integrated circuit. These leads are shunted to ground by 22 picofarad capacitors 93 and 94, respectively. The microcomputer procedure also starts executing at an initial location whenever power to the microcomputer is first turned on, as indicated by a power on reset signal $\overline{RESET}$ applied to lead 4 of the microcomputer by an RC network comprising a 1 microfarad electrolytic capacitor 95 and a 20 megohm resistor 96. The +5V power line to the microcomputer 55 is also decoupled by a 22 microfarad capacitor 97 and a 0.1 microfarad capacitor 98 to ensure that spikes or noise from the power supply 80 do not disturb the procedure executed by the microcomputer.

The microcomputer 55 generates activating signals to the individual solenoid valve coils SOL A, SOL B, SOL C, SOL D and SOL E in proper sequence to control the drying and regeneration performed by the desiccant beds 21, 22. The output interface 61 for driving the solenoids SOL A-E comprises a set of 2.2K ohm pull-up resistors 99 and an output buffer 100, part number MC1413P. The microcomputer outputs P15-P10 on leads 32-27 are connected to the input leads 1-7 of the output buffer 100 which drive the output leads 16-10 of the output buffer, which in turn drive the solenoid coils SOL A-E and the alarm relay REL, respectively. The +5V power line to the output buffer 100 is decoupled by a 0.1 microfarad capacitor 101.

The microcomputer also performs diagnostic and indicating functions to inform a maintenance person of the status of the air dryer and control system. The indicator interface 63 has a set of 2.2K ohm pull-up resistors 102 and an output buffer integrated circuit 103, Motorola Inc. part No. MC1413P. Microcomputer outputs P27-P24 and P17-P16 feed output buffer leads 1-6 which in turn drive output buffer output leads 16-11 connected to light emitting diodes 104-109, respectively. These light emitting diodes (LEDs) indicate right probe malfunction, left probe malfunction, exhaust valve malfunction, inlet valve malfunction, fixed cycle, and probe cycle operation, respectively. The microcomputer is also programmed to activate the alarm relay REL (active when deenergized) whenever one of these malfunctions occur. The output buffer integrated circuit 103 has its +5 volt input line shunted to ground by a 0.1 microfarad decoupling capacitor 103a. The +5 volt power line also drives a "power on" indicating LED 110. Two additional LEDs 111 and 112 shunt the solenoid coils SOL A and SOL B, respectively, to indicate whether the right desiccant bed is drying or whether the left desiccant bed is drying. As is evident from the fact that the power indicating LED 110 shunts the +5 volt power line, these LEDs must be rated at 5 volts or have internal current limiting resistors. A typical part number is Hewlett-Packard Co. HLMP-3600.

The operation of the exemplary control system as specifically wired in FIG. 7 is precisely defined by the procedure or set of instructions stored in the microcomputer's read only memory. An exemplary procedure or program listing is appended to the specification just before the claims. Although comments describing the flow of execution are liberally included in the program, there are three general functions performed by the program which are of interest in understanding the overall operation of the control system. These include a fixed cycle procedure, a probe-controlled cycle procedure, and the procedure which controls the operation of the counter integrated circuit 58.

Figure 8:
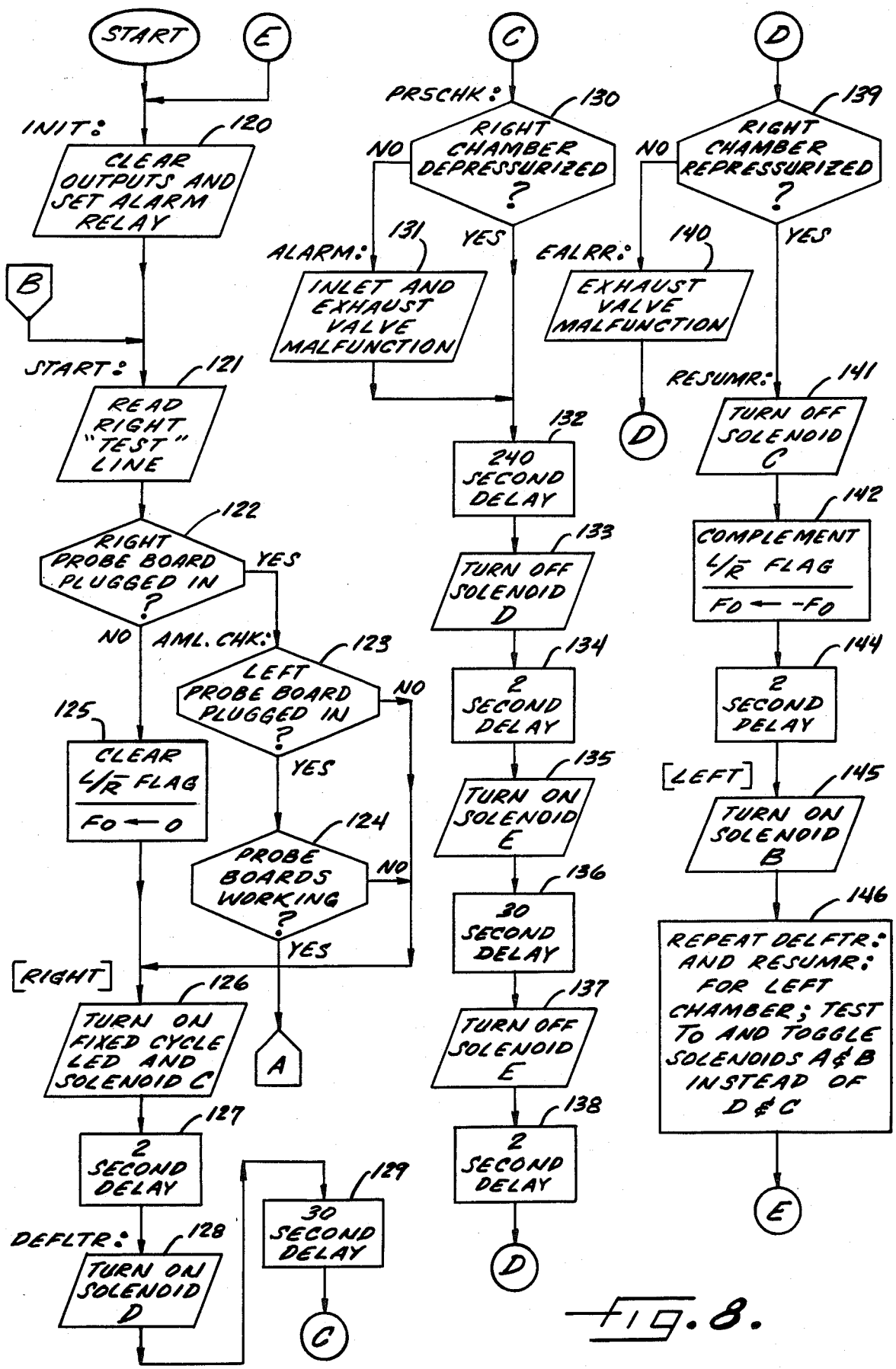
FIG. 8 is a flow chart for the initialization and fixed control cycle procedure or sequence of instructions for execution by the microcomputer.
Figure 9:
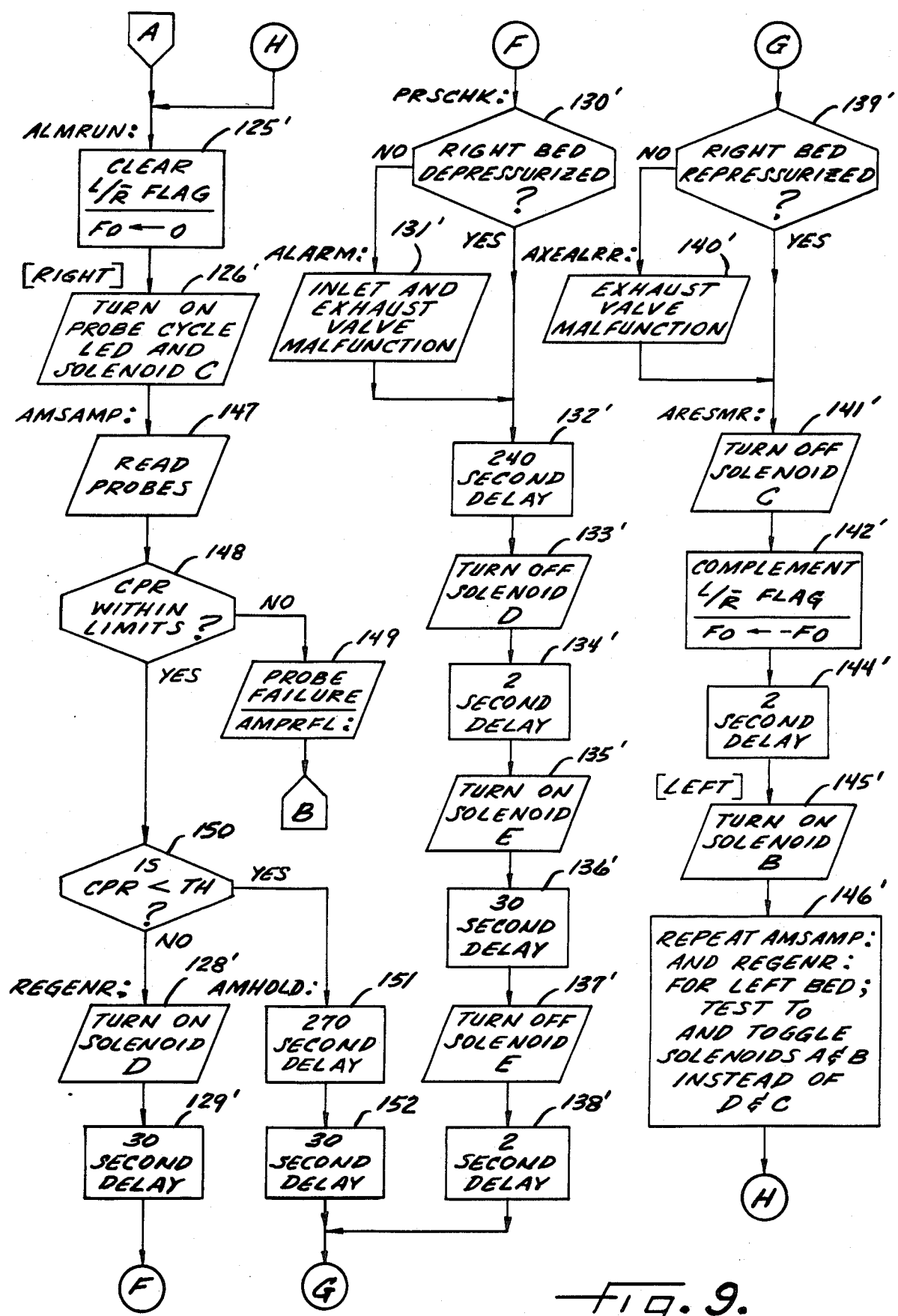
FIG. 9 is a flow chart of the proble-controlled cycle procedure for controlling the dryer.
Figure 10:
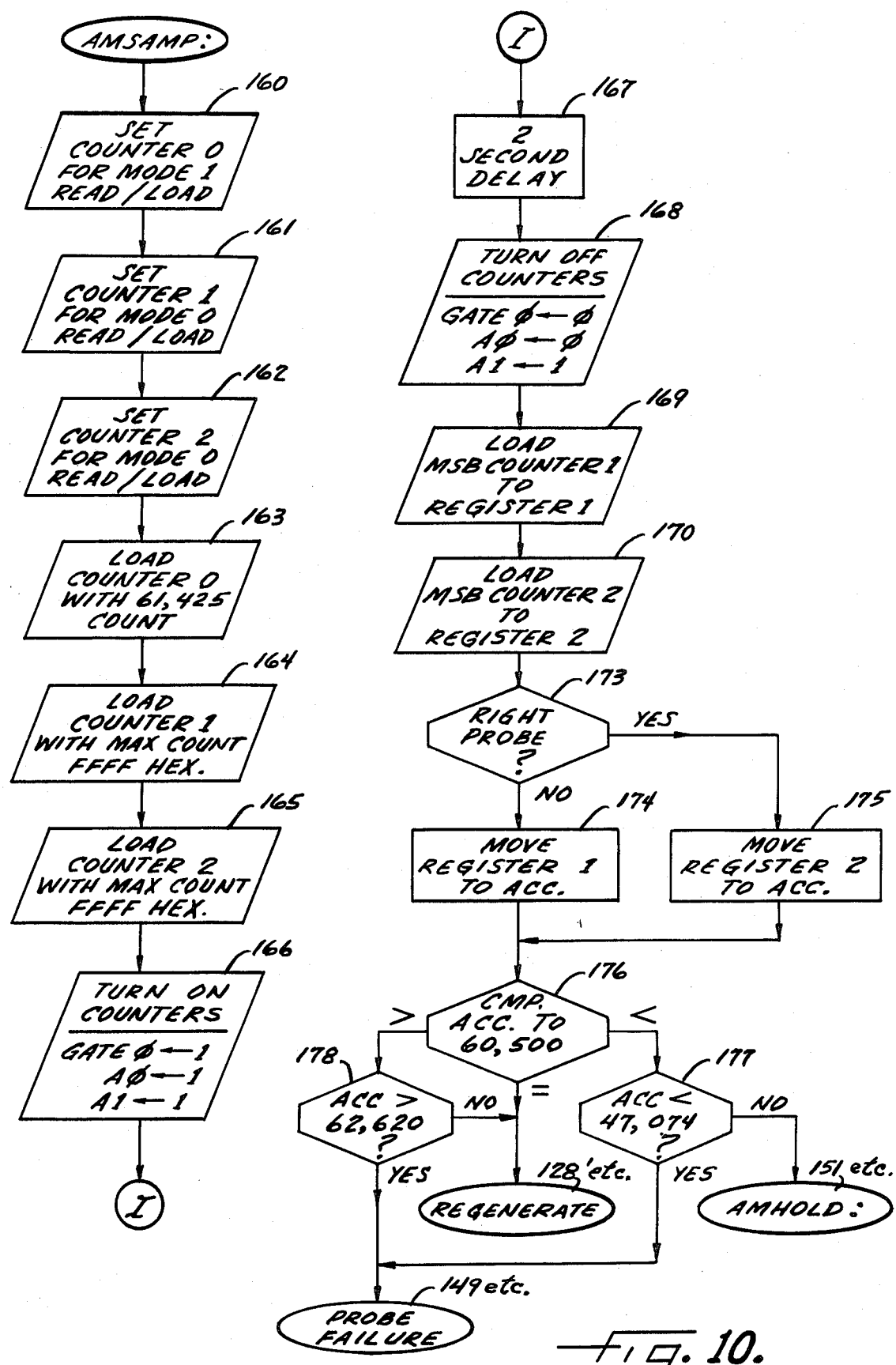
FIG. 10 is a flow chart for the procedure which initially loads the counters in the counter integrated circuit, reads the final counts, and performs the comparison functions on the final count to sense probe failure and to determine whether the idle desiccant bed is to be regenerated.

A flowchart for the control loop which performs fixed cycle operation of the air dryer is shown in FIG. 8. FIG. 8 and FIGS. 9 and 10 are annotated with program labels, identified by suffixed colons, which reference the corresponding sections in the program listing appended as part of the specification.

The first step 120 in the fixed cycle control loop of FIG. 8 is to clear the outputs P10-P17 and P20-P27 of the microcomputer 55. The alarm relay REL, however, is energized so that loss of power to the control system will be indicated by the alarm relay.

Once the outputs are cleared, execution jumps into the fixed cycle loop. In step 121 the right TEST line is read so that in step 122 the microcomputer may determine whether the right probe interface board is plugged in. If the right probe interface board is plugged in, then in step 123 the microcomputer reads the left TEST line to check whether the left probe interface board is also plugged in. If both boards are plugged in, then in step 124 the microcomputer determines whether both probe interface circuits 57, 57' are working by actually measuring the left and right output frequencies FOUT. The manner in which the output frequency FOUT is measured is explained below in reference to FIG. 10. If the probe interface circuits are working, then execution of the microcomputer jumps via the off-page connector A to the probe-controlled cycle shown in FIG. 9.

If the right probe board is not plugged in, step 125 the L/R̄ flag F0 is set to 0 so that the right desiccant bed is initially selected for regeneration.

The first half portion (labeled [RIGHT]) of the fixed cycle control loop starts with step 126 which instructs the microcomputer to turn on the fixed cycle indicator 107 and solenoid SOL C. When solenoid SOL C is activated, the input valve 40 in FIG. 3 directs the flow of air from the compressor 24 to the left desiccant bed 21, and also the outlet valve 42 directs the flow of dried air from the left desiccant bed to the output pipe 26. After solenoid SOL C is activated, the control system in step 127 waits for two seconds for the pneumatic system of FIG. 3 to respond. In step 128 solenoid SOL D is turned on to depressurize the right desiccant bed for regeneration. After a thirty second delay in step 129 to assure that depressurization is substantially complete, in step 130 the high pressure coincidence signal T1 is sampled and tested to determine if the right chamber is depressurized. If the coincidence signal T1 is a logical one, then the high pressure sensing switches are in the same states and in step 131 the microcomputer activates the exhaust valve malfunction indicator 105, the inlet valve malfunction indicator 106, and deenergizes the alarm relay REL. Both of the indicators are activated since the failure of the right chamber to depressurize may be due to either the failure of the exhaust valve 48 to open or the failure of the pressure inlet valve 40 to close its path to the right desiccant bed 22.

In step 132 the microcomputer waits for 240 seconds as the right desiccant chamber is regenerated with the valves and solenoids in the positions shown in FIG. 3. During this purge of the right chamber, the microcomputer continually checks the pressure coincidence signals to verify that the exhaust valve stays open, the inlet valve stays closed, and that there are no restrictions creating back pressure in the right chamber.

The microcomputer terminates regeneration of the right chamber in step 133 by turning off solenoid SOL B which closes the exhaust valve 48. After a two second delay in step 134, the microcomputer in step 135 turns on the repressurizing valve 41 to open a connection between the left and right desiccant chambers. After a thirty second delay in step 136, the micrcocomputer turns off solenoid SOL E in step 137 to close the connection. After a two second delay in step 138, the microcomputer in step 139 samples and tests the high pressure coincidence signal T1 to determine whether the right chamber has repressurized. If the high pressure coincidence signal T1 is not a logical one, indicating that the pressures in both the left and right desiccant beds exceed the high pressure threshold, in step 140 the microcomputer turns on the exhaust valve malfunction indicator 105 and deenergizes the alarm relay REL. Execution then loops back to step 139 so that the right desiccant bed is again checked for proper repressurization, and if repressurization occurs, the alarm relay REL is reenergized and the exhaust valve malfunction indicator 105 is turned off.

If the right desiccant bed has repressurized, then in step 141 the microcomputer turns off solenoid SOL C, complements the L/R̄ flag F0 in step 142, and waits for two seconds in step 144 for the pneumatic system to stabilize. This completes the first half of the fixed cycle wherein the left desiccant bed is drying the air stream and the right desiccant bed is being regenerated.

In order to regenerate the left desiccant bed and to use the right desiccant bed for drying, the microcomputer executes the second half of the fixed cycle [LEFT]. In step 145 solenoid SOL B is turned on, corresponding to step 126 in the [RIGHT] section, so that the inlet valve 40 and the outlet valve 42 direct the flow of gas from the compressor 23 through the right hand desiccant bed 22 towards the output pipe 26. Note that the means for generating these signals which alternately energize solenoids SOL B and SOL C in steps 126, 141 and 145 are means for periodically changing bed select signals at least once within a present minimum time period, so that the vapor load is shared between the desiccant beds. Similarly in the procedure generally designated 146, the other steps in the [RIGHT] section are repeated for the left chamber. But the low pressure coincidence signal T0 is sampled and tested instead of the high pressure coincidence signal T1 in steps 130 and step 133, and solenoids SOL A and SOL B are turned on and off instead of solenoids SOL D and SOL C, respectively.

At the end of these steps for the left desiccant bed being regenerated, execution by the microcomputer returns to the initial step 120 to complete the fixed cycle. It should be noted that steps 122-123 are repeated so that during each fixed cycle the microcomputer tries to put execution into the probe-controlled cycle of FIG. 9.

A flow chart for the probe-controlled cycle is shown in FIG. 9. It is similar to the fixed cycle of FIG. 8, and the similar steps are designated with corresponding primed reference numerals. The probe-controlled cycle differs from the fixed cycle starting with step 147 in which the microcomputer reads data from the moisture sensing capacitance probes. The precise method in which data is read from the probes is described below in conjunction with FIG. 10. The net result of the process for reading the data from the capacitance probes is a pair of numbers CPR and CPL representing the level of saturation of the right and left desiccant beds, respectively. In step 148 the number for the right desiccant bed CPR is tested to determine whether it is within a maximum and a minimum limit. If this number is not within these limits, the microcomputer alerts the operator in step 149 by turning on the right probe malfunction indicator 104 and execution is transferred to the fixed cycle routine of FIG. 8. By transferring execution to the fixed cycle routine, the microcomputer activates regeneration enable signals in steps 128-138 at least once after each changing of the bed selected for drying, so that the beds are periodically regenerated regardless of probe failure. If CPR is within the maximum and minimum limits, then in step 150 the microcomputer compares CPR to a predetermined threshold count TH representative of the moisture or condensate saturation level for which regeneration is required. If the count CPR is less than the threshold TH, then the right desiccant chamber is relatively dry and does not need to be regenerated during the current cycle period. Thus the microcomputer will skip the regeneration sequence by waiting for 270 seconds in step 151 and thirty seconds in step 152 to bypass steps 128' through 138'. If the count CPR is not less than the threshold count TH, then the right desiccant bed must be regenerated and for this purpose solenoid SOL D is turned on in step 128' to depressurize the right bed as was performed in the fixed cycle. Note that the signal turning on solenoid SOL D in step 128' is a regeneration enable signal in response to the comparison in step 150 of the sample count CPR to the predetermined threshold TH indicating that regeneration is required.

The steps for reading the capacitance probes and testing the resulting final counts from the counter integrated circuit 58 in FIG. 7 are shown in FIG. 10. In step 160 counter CN0 is set for a "mode 1 read/load" function. This means that counter CN0 is configured to receive an initial count from the microcomputer and to establish a time interval during which the counter CN0 counts clock cycles on its clock input C0, until a maximum or zero count is reached. In step 161 counter CN1 is set for a "mode 0 read/load" function and similarly in step 162 counter CN2 is also set for a "mode 0 read/load" function. With the counters set in these modes, counter CN1 and CN2 will count from their initial counts during the time interval set by the first counter CN0 and will arrive at a final count at the end of the time interval. In other words, the first counter CN0 counts from an initial count to a full scale count, and when the full scale count is reached it generates a sampling or disabling signal which establishes the time for obtaining final counts from the other counters CN1 and CN2. The difference between the initial counts in the counters CN1 and CN2 and their final counts represents the number of cycles of the respective probe frequencies FOUT, being applied to the counter clock inputs CN1 and CN2, during the time interval. Thus the counter integrated circuit 58 performs a frequency determining function.

In step 163, counter CN0 is loaded with an initial count of 61,425. This initial count generates a predetermined time interval of approximately ½ of a second when the counter CN0 is clocked by the 122.88 kilohertz ALE output of the microcomputer 55 [see FIG. 7]. In steps 164 and 165 the microcomputer loads the counters CN1 and CN2 with maximum counts to effectively reset these counters. In step 166 the counters are turned on by passing a "111" binary control code from the control outputs P22-P20 of the microcomputer 55 to the control inputs GATE0, A0, and A1 of the counter integrated circuit 58. After a two second delay in step 167, the microcomputer turns off the counters in step 168 in preparation for reading final counts from the counters CN1 and CN2. In step 169 the most significant byte of the output of counter CN1 is read into the microcomputer's register 1. Thus register 1 contains the number CPL. In step 170 the most significant byte of the counter CN2 output is read into the microcomputer register 2, so that register 2 contains the number CPR. In step 173 the microcomputer tests the L/R̄ flag to determine whether the left or right probe is the pertinent probe for sensing the level of saturation in the idle desiccant bed. Then in step 174 or step 175 the register having the count from the pertinent probe is moved to the microcomputer's accumulator ACC.

To determine whether the idle desiccant bed is to be regenerated or whether there is probe failure, in step 176 the accumulator containing the pertinent final count is compared to a predetermined theshold count TH of 60,500. If the value of the accumulator is less than 60,500 then the measured level of saturation is lower than that indicating regeneration is required. In step 177 the final count in the accumulator is compared to 47,074 representing a predetermined minimum count which is always exceeded when the probe and probe interface circuits are properly functioning. If the accumulator is less than this predetermined minimum count, then probe failure is indicated in step 149. If the final count in the accumulator is not less than the predetermined minimum count, then the regeneration steps 128′ through 138′ in the probe-controlled cycle of FIG. 9 are skipped as execution is transferred to an idle or delay sequence starting with step 151 in FIG. 9. In step 176, if the final count in the accumulator equals the threshold TH of 60,500 then execution may jump directly to the regeneration steps starting with step 128′. But if the final count in the accumulator is greater than the threshold count TH of 60,500, the final count in the accumulator is compared in step 178 to a maximum count of 62,620 to determine whether the final count in the accumulator is excessive. If the final count in the accumulator is greater than the maximum count, then probe failure is indicated and execution continues starting with steps 149. But if the final count in the accumulator is not greater than the predetermined maximum count, then regeneration may proceed starting at step 128′. This completes the description of the software executed by the microcomputer 55. Further details of the software will become apparent to persons skilled in the art upon inspection of the program listing and clarifying comments appended below to the specification.

In view of the above, an intelligent control for a desiccant dryer has been described which provides improved flexible control and expanded diagnostic capabilities. Modifications of the control procedure to accommodate particular models of disiccant dryers may be economically provided by changes in the programming, without extensive hardware changes. Moreover, an improved interface for the moisture sensing probes has been described wherein only a single adjustable resistor is provided for calibrating each probe. Since the frequency generated by the probe interface is substantially a function only of the adjustable resistance and the capacitance of the probe, the output frequency FOUT is a precise indication of the level of saturation of the respective desiccant bed. There are no other analog components subject to drift or aging which lead to significant errors in the sensed moisture. It should be noted that the output frequency FOUT is very accurately determined by the microcomputer and counter integrated circuits since the time base for the frequency counting process is established by the quartz crystal 56.

```
LINE          SOURCE STATEMENT 1
  2
  3
  4
  5
  6
  7         ORG    0                    ;ORGANIZE PROGRAM FROM LOCATION 0
  8 INIT:   ANL    P1,#00000001B        ;INITIALIZE SYSTEM TURN ON RELAY K1
  9         ORL    P1,#00000001B
 10         ANL    P2,#00H              ;INITIALIZE PORT 2 TO OFF STATE
 11         CLR    F1
 12         DIS    I                    ;DISABLE INTERRUPT
 13 START:  JNI    AMLCHK               ;GO TO AMLOC CHECK OF PIN LOW
 14         CLR    F0                   ;SET FLAG 0 TO 0
 15 FIXED:  ORL    P1,#10010000B        ;TURN ON FIXED CYCLE AND SOLENOID C
 16         CALL   STEP                 ;2 SECOND DELAY
 17 DEFLTR: ORL    P1,#00001000B        ;TURN ON SOLENOID D
 18         CALL   DUMP                 ;30 SECOND DELAY
 19         CALL   PRSCHK               ;TEST FOR DEPRESSURIZATION
 20         CALL   PURGE                ;56 SECOND DELAY
 21         ANL    P1,#10010001B        ;TURN OFF SOLENOID D
 22         CALL   STEP                 ;2 SECOND DELAY
 23         ORL    P1,#00000010B        ;TURN ON SOLENOID E
 24         CALL   REPRES               ;30 SECOND DELAY
 25         ANL    P1,#10010001B        ;TURN OFF SOLENOID E
 26         CALL   STEP                 ;2 SECOND DELAY
 27         JNT1   EXALRR               ;EXHAUST VALVE ALARM IF NOT REPRESSURIZED
 28 RESUMR: ANL    P1,#10000001B        ;TURN OFF SOLENOID C
 29         CPL    F0                   ;COMPLEMENT FLAG 0
 30         DIS    I                    ;DISABLE INTERRUPT
 31         CALL   STEP                 ;2 SECOND DELAY
 32         ORL    P1,#00100000B        ;CHAMBER SWITCH TURN ON SOLENOID B
 33         CALL   STEP                 ;2 SECOND DELAY
 34 DEFLTL: ORL    P1,#00000100B        ;TURN ON SOLENOID A
```

```
35              CALL    DUMP            ;30 SECOND DELAY
36              CALL    PRSCHK          ;TEST FOR DEPRESSURIZATION
37              CALL    PURGE           ;56 SECOND DELAY
38              ANL     P1,#10100001B   ;TURN OFF SOLENOID A
39              CALL    STEP            ;2 SECOND DELAY
40              ORL     P1,#00000010B   ;TURN ON SOLENOID E
41              CALL    REPRES          ;30 SECOND DELAY
42              ANL     P1,#10100001B   ;TURN OFF SOLENOID E
43              CALL    STEP            ;2 SECOND DELAY
44              JNT1    EXALRL          ;EXHAUST VALVE ALARM IF NOT REPRESSURIZED
45  RESUML:     ANL     P1,#10000001B   ;TURN OFF SOLENOID B
46              CALL    STEP            ;2 SECOND DELAY
47              CPL     F0              ;COMPLEMENT FLAG 0
48              JMP     INIT            ;CHAMBER SWITCH
49  STEP:       MOV     R7,#30          ;INITIALIZE TIMER FOR 2 SECONDS
50              CLR     A               ;CLEAR ACCUMULATOR
51              MOV     T,A             ;CLEAR TIMER
52  MAIN:       STRT    T               ;START TIMER
53  TEST:       JTF     COUNT           ;TEST TIMER FOR OVERFLOW
54              JMP     TEST            ;LOOP IF NO OVERFLOW
55  COUNT:      STOP    TCNT            ;STOP TIMER
56              DJNZ    R7,MAIN         ;CHECK FOR END OF DELAY
57              RETR                    ;RETURN TO MAIN PROGRAM
58  DUMP:       MOV     R6,#15          ;INITIALIZE TIMER FOR 30 SECONDS
59  DUMP1:      MOV     R7,#30
60              CLR     A               ;CLEAR ACCUMULATOR
61              MOV     T,A             ;CLEAR TIMER
62  MAIN1:      STRT    T               ;START TIMER
63  TEST1:      JTF     COUNT1          ;TEST FOR TIMER OVERFLOW
64              JMP     TEST1           ;LOOP IF NO OVERFLOW
65  COUNT1:     STOP    TCNT            ;STOP TIMER
66              DJNZ    R7,MAIN1        ;CHECK FOR END OF DELAY
67              DJNZ    R6,DUMP1
68              RETR                    ;RETURN TO MAIN PROGRAM
69  PURGE:      MOV     R6,#28          ;INITIALIZE TIMER FOR 56 SECONDS
70  PURGE1:     MOV     R7,#30
71              CALL    PRSCHK          ;TEST FOR DEPRESSURIZATION
72              CLR     A               ;CLEAR ACCUMULATOR
73              MOV     T,A             ;CLEAR TIMER
74  MAIN2:      STRT    T               ;START TIMER
75  TEST2:      JTF     COUNT2          ;TEST FOR TIMER OVERFLOW
76              JMP     TEST2           ;LOOP IF NO OVERFLOW
77  COUNT2:     STOP    TCNT            ;STOP TIMER
78              DJNZ    R7,MAIN2        ;CHECK FOR END OF DELAY
79              DJNZ    R6,PURGE1
80              RETR                    ;RETURN TO MAIN PROGRAM
81  REPRES:     MOV     R6,#15          ;INITIALIZE TIMER FOR 30 SECONDS
82  REPRE:      MOV     R7,#30
83              ANL     P2,#11000000B
84              JF1     CLRA
85              ORL     P1,#00000001B
86  CLRA:       CLR     A               ;CLEAR ACCUMULATOR
87              MOV     T,A             ;CLEAR TIMER
88  MAIN3:      STRT    T               ;START TIMER
89  TEST3:      JTF     COUNT3          ;TEST FOR TIMER OVERFLOW
90              JMP     TEST3           ;LOOP IF NO OVERFLOW
91  COUNT3:     STOP    TCNT            ;STOP TIMER
92              DJNZ    R7,MAIN3        ;CHECK FOR END OF DELAY
93              DJNZ    R6,REPRE
94              RETR                    ;RETURN TO MAIN PROGRAM
95  EXALRR:     ORL     P2,#00100000B   ;TURN ON EXHAUST VALVE MAL. LIGHT
96              IN      A,P1            ;MOVE PORT 1 CONTENTS INTO ACCUMULATOR
97              ANL     A,#10010000B
98              OUTL    P1,A            ;TURN OFF RELAY K1
99              JNT1    EXALRR          ;LOOP IF NO REPRESSURIZATION
100             JF1     INPUT
101             IN      A,P1            ;MOVE PORT 1 CONTENTS INTO ACCUMULATOR
102             ORL     A,#00000001B
103             OUTL    P1,A            ;TURN ON RELAY K1 IF NO OTHER ALARMS
104 INPUT:      IN      A,P2            ;MOVE PORT 2 CONTENTS INTO ACCUMULATOR
```

```
105              ANL      A,#11011111B
106              OUTL     P2,A            ;TURN OFF EXHAUST VALVE MAL. LIGHT
107              JMP      RESUMR          ;RESUME NORMAL OPERATION
108   EXALRL:    ORL      P2,#00100000B   ;TURN ON EXHAUST VALVE MAL. LIGHT
109              IN       A,P1            ;MOVE PORT 1 CONTENTS INTO ACCUMULATOR
110              ANL      A,#10100000B
111              OUTL     P1,A            ;TURN OFF RELAY K1
112              JNT1     EXALRL          ;LOOP IF NO REPRESSURIZATION
113              JF1      NOFIX
114              IN       A,P1            ;MOVE PORT 1 CONTENTS INTO ACCUMULATOR
115              ORL      A,#00000001B
116              OUTL     P1,A            ;TURN ON RELAY K1 IF NO OTHER ALARMS
117   NOFIX:     IN       A,P2            ;MOVE PORT 2 CONTENTS INTO ACCUMULATOR
118              ANL      A,#11011111B
119              OUTL     P2,A            ;TURN OFF EXHAUST VALVE MAL. LIGHT
120              JMP      RESUML          ;RESUME NORMAL OPERATION
121   PRSCHK:    JF0      LEFT            ;CHECK WHICH CHAMBER ON STREAM
122              JT0      ALARM           ;ALARM IF NOT DEPRESSURIZED
123   PRSCH:     IN       A,P2            ;MOVE PORT 2 CONTENTS INTO ACCUMULATOR
124              ANL      A,#11001111B
125              OUTL     P2,A            ;RESET PREVIOUS ALARM LIGHTS
126              JF1      PRSCHA
127              IN       A,P1            ;MOVE PORT 1 CONTENTS INTO ACCUMULATOR
128              ORL      A,#00000001B
129              OUTL     P1,A            ;RESET RELAY K1 IF NO OTHER ALARMS
130   PRSCHA:    RETR                     ;RETURN TO MAIN PROGRAM
131   ALARM:     IN       A,P2            ;MOVE PORT 2 CONTENTS INTO ACCUMULATOR
132              ORL      A,#00110000B
133              OUTL     P2,A            ;TURN ON BOTH VALVE MAL. LIGHTS
134              IN       A,P1            ;MOVE PORT 1 CONTENTS INTO ACCUMULATOR
135              ANL      A,#11111110B
136              OUTL     P1,A            ;TURN OFF RELAY K1
137              RETR                     ;RETURN TO MAIN PROGRAM
138   LEFT:      JT0      ALARM           ;ALARM IF NOT REPRESSURIZED
139              JMP      PRSCH
140   OUT1:      JMP      AMLPFL
141   AMLCHK:    MOV      A,#00001000B
142              OUTL     P2,A
143              CALL     STEP            ;2 SECOND DELAY
144              IN       A,P2            ;MOVE PORT 2 CONTENTS INTO ACCUMULATOR
145              JB3      OUT1            ;IF BIT 3 NOT 0, LEFT PROBE FAIL
146              MOV      R0,#00H         ;MOVE 0 INTO REGISTER 0
147              ORL      P2,#00001011B   ;ADDRESS COUNTER MODE REGISTERS
148              MOV      A,#00110010B    ;SET COUNTER 0 FOR MODE 1, READ/LOAD
149              MOVX     @R0,A           ;LSB THEN MSB, 16 BIT COUNT
150              MOV      A,#01110000B    ;SET COUNTER 1 FOR MODE 0, READ/LOAD
151              MOVX     @R0,A           ;LSB THEN MSB, 16 BIT COUNT
152              MOV      A,#10110000B    ;SET COUNTER 2 FOR MODE 0, READ/LOAD
153              MOVX     @R0,A           ;LSB THEN MSB, 16 BIT COUNT
154              MOV      A,#00H
155              OUTL     P2,A            ;ADDRESS COUNTER 0
156              MOV      A,#11110001B    ;LOAD COUNTER 0 WITH 61,425.0 COUNT
157              MOVX     @R0,A           ;LSB
158              MOV      A,#11101111B    ;MSB
159              MOVX     @R0,A
160              ORL      P2,#00000010B   ;ADDRESS COUNTER 1
161              MOV      A,#11111111B    ;LOAD COUNTER 1 WITH MAX COUNT
162              MOVX     @R0,A           ;LSB
163              MOV      A,#11111111B    ;MSB
164              MOVX     @R0,A
165              MOV      A,#00000001B
166              OUTL     P2,A            ;ADDRESS COUNTER 2
167              MOV      A,#11111111B    ;LOAD COUNTER 2 WITH MAX COUNT
168              MOVX     @R0,A           ;LSB
169              MOV      A,#11111111B    ;MSB
170              MOVX     @R0,A
171              MOV      A,#00000111B
172              OUTL     P2,A            ;START PROBE SAMPLE COUNT
173              CALL     STEP            ;2 SECOND DELAY
174              MOV      A,#00H
175              OUTL     P2,A            ;END PROBE SAMPLE COUNT
```

```
176             MOV    R0,#00H             ;MOVE 0 INTO REGISTER 0
177             ORL    P2,#00000010B       ;ADDRESS COUNTER 1
178             MOVX   A,@R0               ;READ COUNTER 1 LSB INTO ACCUMULATOR
179             MOVX   A,@R0               ;READ COUNTER 1 MSB INTO ACC. LSB IS LOST
180             MOV    R1,A                ;MOVE COUNTER 1 MSB INTO REGISTER 1
181             MOV    A,#00000001B
182             OUTL   P2,A                ;ADDRESS COUNTER 2
183             MOVX   A,@R0               ;READ COUNTER 2 LSB INTO ACCUMULATOR
184             MOVX   A,@R0               ;READ COUNTER 2 MSB INTO ACC. LSB IS LOST
185             MOV    R2,A                ;MOVE COUNTER 2 MSB INTO REGISTER 2
186             MOV    R3,#11111100B       ;MOVE AMLOC CHECK POINT INTO REGISTER 3
187             MOV    A,R1                ;MOVE COUNTER 1 MSB INTO ACCUMULATOR
188             CPL    A                   ;COMPLEMENT ACCUMULATOR
189             INC    A                   ;ADD 1 TO ACCUMULATOR
190             ADD    A,R3                ;ADD R3 TO ACCUMULATOR
191             JZ     ACCLT1              ;ACCUMULATOR = R3, O.K. CHECK NEXT PROBE
192             JC     ACCLT1              ;ACCUMULATOR < R3, O.K. CHECK NEXT PROBE
193             JMP    AMLPFL              ;ACCUMULATOR > R3, LEFT PROBE FAILED
194 OUT2:       JMP    AMRPFL
195 OUT3:       JMP    AEXALR
196 OUT4:       JMP    AEXALL
197 ACCLT1:     MOV    A,R2                ;MOV COUNTER 2 MSB INTO ACCUMULATOR
198             CPL    A                   ;COMPLEMENT ACCUMULATOR
199             INC    A                   ;ADD 1 TO ACCUMULATOR
200             ADD    A,R3                ;ADD R3 TO ACCUMULATOR
201             JZ     AMLRUN              ;ACCUMULATOR = R3, O.K. GO TO AMLOC CYCLE
202             JNC    OUT2                ;ACCUMULATOR > R3, RIGHT PROBE FAILED
203             JC     AMLRUN              ;ACCUMULATOR < R3, O.K. GO TO AMLOC CYCLE
204 AMLRUN:     CLR    F0                  ;SET FLAG 0 TO 0
205             ORL    P1,#01010000B       ;TURN ON AMLOC CYCLE LIGHT & SOLENOID C
206             JMP    AMSAMP              ;SAMPLE PROBE READING
207 REGENR:     ORL    P1,#00001000B       ;TURN ON SOLENOID D
208             CALL   DUMP                ;30 SECOND DELAY
209             CALL   PRSCHK              ;TEST FOR DEPRESSURIZATION
210             CALL   PURGE               ;56 SECOND DELAY
211             ANL    P1,#01010001B       ;TURN OFF SOLENOID D
212             CALL   STEP                ;2 SECOND DELAY
213             ORL    P1,#00000010B       ;TURN ON SOLENOID E
214             CALL   REPRES              ;30 SECOND DELAY
215             ANL    P1,#01010001B       ;TURN OFF SOLENOID E
216             CALL   STEP                ;2 SECOND DELAY
217 AMRETR:     JNT1   OUT3                ;EXHAUST VALVE ALARM IF NOT REPRESSURIZED
218 ARESMR:     ANL    P1,#01000001B       ;TURN OFF SOLENOID C
219             CPL    F0                  ;COMPLEMENT FLAG 0
220             DIS    I                   ;DISABLE INTERRUPT
221             CALL   STEP                ;2 SECOND DELAY
222             ORL    P1,#00100000B       ;CHAMBER SWITH TURN ON SOLENOID B
223             JMP    AMSAMP              ;SAMPLE PROBE READING
224 REGENL:     ORL    P1,#00000100B       ;TURN ON SOLENOID A
225             CALL   DUMP                ;30 SECOND DELAY
226             CALL   PRSCHK              ;TEST FOR DEPRESSURIZATION
227             CALL   PURGE               ;56 SECOND DELAY
228             ANL    P1,#01100001B       ;TURN OFF SOLENOID A
229             CALL   STEP                ;2 SECOND DELAY
230             ORL    P1,#00000010B       ;TURN ON SOLENOID E
231             CALL   REPRES              ;30 SECOND DELAY
232             ANL    P1,#01100001B       ;TURN OFF SOLENOID E
233             CALL   STEP                ;2 SECOND DELAY
234 AMRETL:     JNT1   OUT4                ;EXHAUST VALVE ALARM IF NOT REPRESSURIZED
235 ARESML:     ANL    P1,#01000001B       ;TURN OFF SOLENOID B
236             CALL   STEP                ;2 SECOND DELAY
237             JMP    AMLRUN              ;CHAMBER SWITCH
238 AMHOLD:     MOV    R6,#60              ;INITIALIZE TIMER FOR 120 SECONDS
239 AMHOL1:     MOV    R7,#30
240             CLR    A                   ;CLEAR ACCUMULATOR
241             MOV    T,A                 ;CLEAR TIMER
242 MAIN4:      STRT   T                   ;START TIMER
243 TEST4:      JTF    COUNT4              ;TEST FOR TIMER OVERFLOW
244             JMP    TEST4               ;LOOP IF NO OVERFLOW
245 COUNT4:     STOP   TCNT                ;STOP TIMER
```

```
246             DJNZ    R7,MAIN4            ;CHECK FOR END OF DELAY
247             DJNZ    R6,AMHOL1
248             CALL    REPRES              ;30 SECOND DELAY
249             JF0     AMRETL
250             JMP     AMRETR
251 AMSAMP:     MOV     R0,#00H             ;MOVE 0 INTO REGISTER 0
252             ORL     P2,#00000011B       ;ADDRESS COUNTER MODE
253             MOV     A,#00110010B        ;SET COUNTER 0 FOR MODE 1 READ/LOAD
254             MOVX    @R0,A               ;LSB THEN MSB, 16 BIT COUNT
255             MOV     A,#01110000B        ;SET COUNTER 1 FOR MODE 0 READ/LOAD
256             MOVX    @R0,A               ;LSB THEN MSB, 16 BIT COUNT
257             MOV     A,#10110000B        ;SET COUNTER 2 FOR MODE 0 READ/LOAD
258             MOVX    @R0,A               ;LSB THEN MSB, 16 BIT COUNT
259             ORL     P2,#00000100B
260             ANL     P2,#11111100B       ;ADDRESS COUNTER 0
261             MOV     A,#11110001B        ;LOAD COUNTER 0 WITH 61,425.0 COUNT
262             MOVX    @R0,A               ;LSB RESULTS IN A .5 SECOND SAMPLE COUNT
263             MOV     A,#11101111B        ;MSB
264             MOVX    @R0,A
265             ORL     P2,#00000010B       ;ADDRESS COUNTER 1
266             MOV     A,#11111111B        ;LOAD COUNTER 1 WITH MAX COUNT
267             MOVX    @R0,A               ;LSB
268             MOV     A,#11111111B        ;MSB
269             MOVX    @R0,A
270             ANL     P2,#11111100B
271             ORL     P2,#00000001B       ;ADDRESS COUNTER 2
272             MOV     A,#11111111B        ;LOAD COUNTER WITH MAX COUNT
273             MOVX    @R0,A               ;LSB
274             MOV     A,#11111111B        ;MSB
275             MOVX    @R0,A
276             ORL     P2,#00000111B       ;START SAMPLE COUNT
277             CALL    STEP                ;2 SECOND DELAY
278             ANL     P2,#11111000B       ;END SAMPLE COUNT
279             MOV     R0,#00H             ;MOVE 0 INTO REGISTER 0
280             ORL     P2,#00000010B       ;ADDRESS COUNTER 1
281             MOVX    A,@R0               ;READ COUNTER 1 LSB INTO ACCUMULATOR
282             MOVX    A,@R0               ;READ COUNTER 1 MSB INTO ACC. LSB IS LOST
283             MOV     R1,A                ;MOVE COUNTER 1 MSB INTO REGISTER 1
284             ANL     P2,#11111000B
285             ORL     P2,#00000001B       ;ADDRESS COUNTER 2
286             MOVX    A,@R0               ;READ COUNTER 2 LSB INTO ACCUMULATOR
287             MOVX    A,@R0               ;READ COUNTER 2 MSB INTO ACC. LSB IS LOST
288             MOV     R2,A                ;MOVE COUNTER 2 MSB INTO REGISTER 2
289             MOV     R3,#11011110B       ;MOVE AMLOC SET POINT 56,832.0 INTO R3
290             JF0     ALEFT               ;CHECK WHICH PROBE PERTINENT
291             MOV     A,R2                ;MOVE COUNTER 2 MSB INTO ACCUMULATOR
292             CPL     A                   ;COMPLEMENT ACCUMULATOR
293             INC     A                   ;ADD 1 TO ACCUMULATOR
294             MOV     R4,A                ;SAVE ACCUMULATOR CONTENTS IN REGISTER 4
295             ADD     A,R3                ;ADD REGISTER 3 TO ACCUMULATOR
296             JZ      REGENR              ;ACCUMULATOR = R3, REGENERATE RIGHT BED
297             JNC     HILIM               ;ACCUMULATOR > R3, CHECK ALARM LIMIT
298             JC      LOWLIM              ;ACCUMULATOR < R3, CHECK ALARM LIMIT
299 ALEFT:      MOV     A,R1                ;MOVE COUNTER 1 MSB INTO ACCUMULATOR
300             CPL     A                   ;COMPLEMENT ACCUMULATOR
301             INC     A                   ;ADD 1 TO ACCUMULATOR
302             MOV     R4,A                ;SAVE ACCUMULATOR CONTENTS IN REGISTER 4
303             ADD     A,R3                ;ADD REGISTER 3 TO ACCUMULATOR
304             JZ      REGENL              ;ACCUMULATOR = R3, REGENERATE LEFT BED
305             JNC     HILIM               ;ACCUMULATOR > R3, CHECK ALARM LIMIT
306             JC      LOWLIM              ;ACCUMULATOR < R3, CHECK ALARM LIMIT
307 HILIM:      MOV     A,R4                ;RETRIVE ORIGINAL ACCUMULATOR CONTENTS
308             ADD     A,#11110100B        ;ADD HI LIMIT SETPOINT 62,620.0 TO ACC.
309             JZ      AMPRFL              ;ACCUMULATOR = SETPOINT, PROBE FAILED
310             JNC     AMPRFL              ;ACCUMULATOR > SETPOINT, PROBE FAILED
311             JF0     REGENL              ;ACCUMULATOR < SETPOINT, REGENERATE BED
312             JMP     REGENR
313 LOWLIM:     MOV     A,R4                ;RETRIVE ORIGINAL ACCUMULATOR CONTENTS
314             ADD     A,#10110111B        ;ADD LOW LIMIT SETPOINT 47,074.0 TO ACC.
315             JZ      AMPRFL              ;ACCUMULATOR = SETPOINT, PROBE FAILED
316             JC      AMPRFL              ;ACCUMULATOR < SETPOINT, PROBE FAILED
317             JMP     AMHOLD              ;ACCUMULATOR > SETPOINT, GO INTO AMLOC HOLD
```

```
318 OUT5:    JMP     AMPRLF
319 AMPRFL:  JFO     OUT5                    ;DETERMINE WHICH PROBE FAILED
320          ORL     P2,#10000000B           ;TURN ON RIGHT PROBE MAL. LIGHT
321          IN      A,P1                    ;MOVE PORT 1 CONTENTS INTO ACCUMULATOR
322          ANL     A,#10111110B
323          OUTL    P1,A                    ;TURN OFF RELAY K1 & AMLOC CYCLE LIGHT
324          ORL     P1,#10000000B           ;TURN ON FIXED CYCLE LIGHT
325          CPL     F1
326          JMP     DEFLTR                  ;RETURN TO MAIN PROGRAM IN FIXED CYCLE
327 AMPRLF:  ORL     P2,#01000000B           ;TURN ON LEFT PROBE MAL. LIGHT
328          IN      A,P1                    ;MOVE PORT 1 CONTENTS INTO ACCUMULATOR
329          ANL     A,#10111110B
330          OUTL    P1,A                    ;TURN OFF RELAY K1 & AMLOC CYCLE LIGHT
331          ORL     P1,#10000000B           ;TURN ON FIXED CYCLE LIGHT
332          CPL     F1
333          JMP     DEFLTL                  ;RETURN TO MAIN PROGRAM IN FIXED CYCLE
334 AMLPFL:  IN      A,P1                    ;MOVE PORT 1 CONTENTS INTO ACCUMULATOR
335          ANL     A,#11111110B
336          OUTL    P1,A                    ;TURN OFF RELAY K1
337          ORL     P2,#01000000B           ;TURN ON LEFT PROBE MAL. LIGHT
338          CPL     F1
339          JMP     FIXED                   ;GO INTO FIXED CYCLE
340 AMRPFL:  IN      A,P1                    ;MOVE PORT 1 CONTENTS INTO ACCUMULATOR
341          ANL     A,#11111110B
342          OUTL    P1,A                    ;TURN OFF RELAY K1
343          ORL     P2,#10000000B           ;TURN ON RIGHT PROBE MAL. LIGHT
344          CPL     F1
345          JMP     FIXED                   ;GO INTO FIXED CYCLE
346 AEXALR:  ORL     P2,#00100000B           ;TURN ON EXHAUST VALVE MALFUNCTION LIGHT
347          IN      A,P1                    ;MOVE PORT 1 CONTENTS INTO ACCUMULATOR
348          ANL     A,#11111110B
349          OUTL    P1,A                    ;TURN OFF RELAY K1
350          JNT1    AEXALR                  ;LOOP IF NO REPRESSURIZATION
351          IN      A,P1                    ;MOVE PORT 1 CONTENTS INTO ACCUMULATOR
352          ORL     A,#00000001B
353          OUTL    P1,A                    ;TURN ON RELAY K1
354          IN      A,P2                    ;MOVE PORT 2 CONTENTS INTO ACCUMULATOR
355          ANL     A,#11011111B
356          OUTL    P2,A                    ;TURN OFF EXHAUST VALVE MALFUNCTION LIGHT
357          JMP     ARESMR                  ;RESUME NORMAL OPERATION
358 AEXALL:  ORL     P2,#00100000B           ;TURN ON EXHAUST VALVE MALFUNCTION LIGHT
359          IN      A,P1                    ;MOVE PORT 1 CONTENTS INTO ACCUMULATOR
360          ANL     A,#11111110B
361          OUTL    P1,A                    ;TURN OFF RELAY K1
362          JNT0    AEXALL                  ;LOOP IF NO REPRESSURIZATION
363          IN      A,P1                    ;MOVE PORT 1 CONTENTS INTO ACCUMULATOR
364          ORL     A,#00000001B
365          OUTL    P1,A                    ;TURN ON RELAY K1
366          IN      A,P2                    ;MOVE PORT 2 CONTENTS INTO ACCUMULATOR
367          ANL     A,#11011111B
368          OUTL    P2,A                    ;TURN OFF EXHAUST VALVE MALFUNCTION LIGHT
369          JMP     ARESML                  ;RESUME NORMAL OPERATION
370          END
```

What is claimed is:

1. A control system for a desiccant gas dryer having a first desiccant bed and a second desiccant bed, gas to be dried being alternately directed by valves to pass through one of the beds providing adsorbtion of vapor while the other desiccant bed is being regenerated or is in an idle condition in response to at least one bed select signal and at least one regeneration enable signal, respectively, energy being required for the regeneration process, the control system comprising, in combination, a capacitance probe in each desiccant bed so that the level of condensate saturation of the desiccant in each bed is indicated by the capacitance of the respective probe, at least one oscillator having a frequency setting capacitance input connected to the probe in the desiccant bed having been used for adsorbtion of vapor, so that the oscillator frequency is indicative of the capacitance of the connected probe and thus indicative of whether the desiccant bed needs to be regenerated, timer means for establishing a predetermined time interval, means for counting the cycles of the oscillator frequency over said predetermined time interval, means for obtaining a final count from the means for counting at the end of said predetermined time interval so that the numeric value of the final count is indicative of the level of condensate saturation of the respective desiccant bed, and a microcomputer executing a stored sequence of instructions, said microcomputer comprising first means for comparing the final count to a predetermined threshold count representative of the condensate saturation level for which regeneration is required, and means for generating said regeneration enable signal in response to said means for comparing the final count to the predetermined threshold indicating that regeneration is required.

2. The control system as claimed in claim 1 wherein the microcomputer further comprises means for periodically changing the bed select signal at least once within a preset minimum time period, so that the vapor load is shared between the desiccant beds.

3. The control system as claimed in claim 2, wherein the microcomputer further comprises:

second means for comparing the final count to a predetermined maximum count, third means for comparing the final count to a predetermined minimum count, means for indicating to a maintenance person that probe failure is sensed when the second means for comparing indicates that the final count exceeds the maximum count, and also being activated when the third means for comparing indicates that the final count is less than the predetermined minimum count, and means for activating the regeneration enable signal at least once after each change of the bed select signal, so that the beds are periodically regenerated regardless of probe failure.

4. The control system as claimed in claim 1, being operative for controlling a heaterless gas dryer wherein the beds are regenerated at a predetermined minimum pressure and the gas is dried at a predetermined elevated pressure, and further comprising:

for each bed a high pressure sensing switch and a low pressure sensing switch responsive to the gas pressure in the respective bed, the threshold of the high pressure switches being substantially below the elevated gas pressure, and the threshold of the low pressure switches being substantially below the threshold of the high pressure switches and substantially above the minimum pressure, means for generating a high pressure coincidence signal active when the high pressure switches are in the same states, means for generating a low pressure coincidence signal active when the low pressure switches are in the same states, and wherein the microcomputer comprises first means for sampling both the high pressure coincidence signal and the low pressure coincidence signal at least once, when the regeneration enable signal is active, during each full cycle of the bed change signal, at a time sufficiently delayed from the times of change in the bed change signal and the regenerate enable signal so that for the pressures in the beds stabilize prior to sampling, and means for indicating the occurrence of a general valve malfunction to a maintenance person if at least one of the samples of the pressure coincidence signals sampled by the first means for sampling are active.

5. The control system as claimed in claim 4, further comprising second means for sampling each pressure coincidence signal at least once when the regeneration enable signal is not active, and during each full cycle at a time sufficiently delayed from the time of change in the bed change signal and the regenerate enable signal so that the pressures in the beds stabilize prior to sampling by said second means for sampling, and means for indicating the occurrence of an exhaust valve malfunction if at least one of the samples of the pressure coincidence signal, sampled by the second means for sampling, is not active.

6. The combination as claimed in claim 1, further comprising a multiple counter integrated circuit external to the microcomputer, wherein said multiple counter integrated circuit itself comprises said means for counting, said timer means and said means for obtaining a final count from the means for counting.

7. The combination as claimed in claim 1, further comprising means for the microcomputer to activate said valves to alternately direct the gas to be dried through the beds, wherein said valves are operated by high pneumatic pressure, said means for the microcomputer to activate said valves comprising, low flow rate capacity solenoid valves driven by electrical signals from the microcomputer, and pneumatic relays driven by the pneumatic outputs of the solenoid valves and driving said pneumatically operated valves.

* * * * *